United States Patent
Yamanaka et al.

(10) Patent No.: US 7,529,559 B2
(45) Date of Patent: May 5, 2009

(54) COMMUNICATION APPARATUS AND METHOD FOR RECONFIGURING COMMUNICATION APPARATUS

(75) Inventors: Ryutaro Yamanaka, Yokohama (JP); Toshihiro Ishikawa, Yokohama (JP)

(73) Assignee: Panasonic Corporation, Osaka (JP)

( * ) Notice: Subject to any disclaimer, the term of this patent is extended or adjusted under 35 U.S.C. 154(b) by 131 days.

(21) Appl. No.: 10/530,208

(22) PCT Filed: Oct. 6, 2003

(86) PCT No.: PCT/JP03/12750

§ 371 (c)(1),
(2), (4) Date: Apr. 4, 2005

(87) PCT Pub. No.: WO2004/032355

PCT Pub. Date: Apr. 15, 2004

(65) Prior Publication Data

US 2006/0003795 A1  Jan. 5, 2006

(30) Foreign Application Priority Data

Oct. 7, 2002  (JP) .............................. 2002-294031

(51) Int. Cl.
*H04M 1/00* (2006.01)
*H04M 3/00* (2006.01)
(52) U.S. Cl. .................. 455/550.1; 455/552.1; 455/418
(58) Field of Classification Search ................. 455/38.3, 455/424, 550.1, 552.1, 556.1, 418, 419, 425, 455/183.2
See application file for complete search history.

(56) References Cited

U.S. PATENT DOCUMENTS

| 5,809,432 | A | * | 9/1998 | Yamashita | 455/575.1 |
| 5,828,949 | A | * | 10/1998 | Silver et al. | 455/433 |
| 5,854,984 | A | * | 12/1998 | Buhrmann et al. | 455/552.1 |
| 5,909,463 | A | * | 6/1999 | Johnson et al. | 375/220 |
| 5,991,279 | A | * | 11/1999 | Haugli et al. | 370/311 |
| 6,052,600 | A | * | 4/2000 | Fette et al. | 455/509 |
| 6,181,258 | B1 | * | 1/2001 | Summers et al. | 340/870.28 |
| 6,185,418 | B1 | | 2/2001 | MacLellan et al. | |
| 6,230,026 | B1 | * | 5/2001 | Schwaller et al. | 455/561 |
| 6,310,646 | B1 | * | 10/2001 | Shi et al. | 348/194 |
| 6,349,216 | B1 | * | 2/2002 | Alberth et al. | 455/550.1 |
| 6,487,405 | B1 | * | 11/2002 | Dapper | 455/424 |

(Continued)

FOREIGN PATENT DOCUMENTS

EP  0 941 002  9/1999

(Continued)

OTHER PUBLICATIONS

Japanese Office Action dated Dec. 2, 2008 with English translation.

*Primary Examiner*—Sonny Trinh
(74) *Attorney, Agent, or Firm*—Dickinson Wright, PLLC

(57) ABSTRACT

Digital signal processing section 103 has reconfigurable device 131, and reconfigurable device 131 configures decoding section 133 and coding section 134 by programming data. Decoding section 133 acquires synchronization from a signal output from reception section 121, and demodulates and decodes the signal. CPU 105 downloads programming data of another radio communication system to store in storage section 106 via general bus 104. Further, CPU 105 reads out the stored programming data, and reconfigures reconfigurable device 131. Storage section 106 stores the programming data.

17 Claims, 24 Drawing Sheets

U.S. PATENT DOCUMENTS

| | | | |
|---|---|---|---|
| 6,529,488 B1 * | 3/2003 | Urs et al. | 370/330 |
| 6,785,556 B2 * | 8/2004 | Souissi | 455/557 |
| 7,031,668 B2 * | 4/2006 | Darabi et al. | 455/75 |
| 7,142,882 B2 * | 11/2006 | Schmidt | 455/552.1 |
| 7,283,838 B2 * | 10/2007 | Lu | 455/550.1 |
| 2002/0119803 A1 * | 8/2002 | Bitterlich et al. | 455/552 |
| 2002/0141441 A1 * | 10/2002 | Neumann et al. | 370/465 |
| 2002/0150174 A1 * | 10/2002 | Spiegel et al. | 375/316 |
| 2004/0081248 A1 * | 4/2004 | Parolari | 375/259 |

FOREIGN PATENT DOCUMENTS

| | | |
|---|---|---|
| EP | 11-285066 | 10/1999 |
| JP | 1155147 | 2/1999 |
| JP | 11220413 | 8/1999 |
| JP | 11-346383 | 12/1999 |
| JP | 2000324043 | 11/2000 |
| JP | 2001189675 | 7/2001 |
| JP | 200226749 | 1/2002 |
| JP | 2003110454 | 4/2003 |

* cited by examiner

COMMUNICATION APPARATUS AND METHOD FOR RECONFIGURING COMMUNICATION APPARATUS

TECHNICAL FIELD

The present invention relates to a communication apparatus and communication apparatus reconfiguration method, and more particularly, to a communication apparatus and communication apparatus reconfiguration method suitable for use in a hand over system for switching between a plurality of radio communication systems.

BACKGROUND ART

Currently, various radio communication systems exist such as 2nd generation radio communication systems such as PDC and GSM, 3rd generation radio communication systems such as W-CDMA, and PHS and wireless LAN. As a technique for supporting a plurality of radio communication systems using a single radio apparatus, software defined radio exists that varies between functions by updating of software (programming data).

When switching between radio communication systems (which generally means handover between radio communication systems or the case of updating programming data, but it is herein assumed that handover includes the case of only updating programming data), a conventional software defined radio apparatus downloads software to support a communication system of a handover destination switching from a communication system used in current communications of a communication apparatus, and then, reconfigures a communication apparatus that supports a radio communication system of the handover destination using the downloaded data.

With respect to switching of radio communication systems, there is a method for implementing the switching by reprogramming (reconfiguring) a reconfigurable device (for example, see Japanese Laid-Open Patent Publication H11-220413). Further, it is considered providing a download dedicated channel to implement fast download (for example, see Japanese Laid-Open Patent Publication 2000-324043).

Currently, in a mobile communication terminal, it is demanded to switch from a communication system of current communications to another communication system at high speed, and concurrently, it is desired to improve the user capacity of the entire system. From these viewpoints, in the constitution as disclosed in Patent Document 1, a call is suspended or disconnected during download, and it is not possible to perform fast handover between radio communication systems. Further, as disclosed in Patent Document 2, when a download dedicated channel is provided to download programming data, there are possibilities that spectral efficiency deteriorates and the user capacity of the entire system decreases.

When data of a radio communication system with a large amount (hereinafter, referred to as "large-scale") of programming data is downloaded during communication in a narrowband radio communication system with low transmission rates, retransmission is apt to occur and it takes enormous time to complete the download. In particular, retransmission occurs remarkably in poor radio signal propagation circumstances.

Further, when individual mobile communication terminals are operated to perform fast download in a wideband radio communication system with high transmission rates, there arise problems that the spectral efficiency deteriorates and the user capacity of the entire system decreases.

Furthermore, when a reconfigurable device such as a PLD (Programmable Logic Device) or FPGA (Field Programmable Gate Array) is used in the mobile radio baseband signal processing, it is possible to support any operation such as, for example, FFT (Fast Fourier Transform), correlator, and FEC (Forward Error Correction), flexibility is thus high, and development time is shortened. However, the circuit scale and power consumption tends to increase in PLD and FPGA.

Meanwhile, when custom ASIC is used in the mobile radio baseband signal processing, it is possible to suppress the circuit scale and power consumption because of dedicated circuitry, but flexibility is low because application is limited to, for example, FFT when FFT is used. Further, its development time is long.

As described above, in conventional apparatuses, when a communication apparatus downloads programming data of a radio communication system and switches details of the system to the downloaded programming data, there exist such problems that an amount of programming data is large, download time is long, and it takes much time to switch between systems.

DISCLOSURE OF INVENTION

It is an object of the present invention to provide a communication apparatus and communication apparatus reconfiguration method for reducing the time required for download without decreasing the user capacity of the entire system, and as a result, switching between communication systems for a short time.

The object is achieved by only reconfiguring a portion different among a plurality of radio communication systems, thereby decreasing an amount of data to reconfigure among the programming data of a target radio communication system, reducing the time required for download, and switching between communication systems for a short time in a software radio apparatus that varies the function by rewrite of software for performing signal processing.

BEST MODE FOR CARRYING OUT THE INVENTION

It is a gist of the present invention only reconfiguring a portion different among a plurality of radio communication systems, thereby decreasing an amount of data to reconfigure among the programming data of a target radio communication system, reducing the time required for download, and switching between communication systems for a short time in a software radio apparatus that varies the function by rewrite of software for performing signal processing.

Embodiments of the present invention will specifically be described below with reference to accompanying drawings.

Embodiment 1

Figure 1:
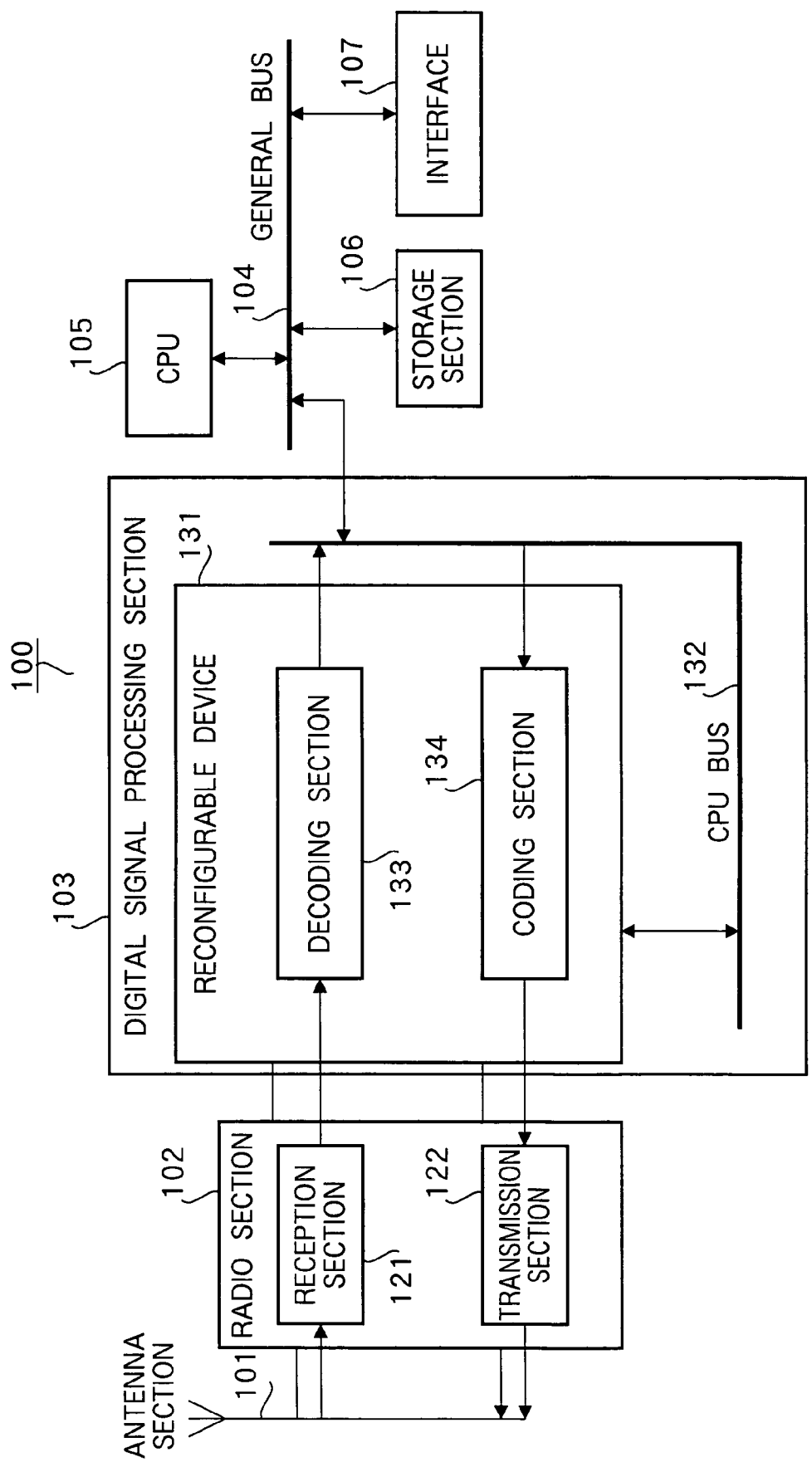
FIG. 1 is a block diagram illustrating a configuration of a communication apparatus according to Embodiment 1 of the present invention.

FIG. 1 is a block diagram illustrating a configuration of a communication apparatus according to Embodiment 1 of the present invention. Communication apparatus 100 is mainly comprised of antenna section 101, radio section 102, digital signal processing section 103, general bus 104, CPU 105, storage section 106 and interface 107. Radio section 102 is mainly comprised of reception section 121 and transmission section 122. Digital signal processing section 103 has reconfigurable device 131, and reconfigurable device 131 is connected to general bus 104 via CPU bus 132.

In FIG. 1, radio section 102 has reception section 121 and transmission section 122, and performs predetermined radio processing on a reception signal and transmission signal.

Reception section 121 receives a signal transmitted from a communicating party station not shown via antenna section 101, performs predetermined radio reception processing (downconverting, A/D conversion, etc.) on the received signal (reception signal), and outputs the signal subjected to the radio reception processing to digital signal processing section 103.

Digital signal processing section 103 has reconfigurable device 131, and decoding section 133 and coding section 134 are configured by programming data in reconfigurable device 131.

Decoding section 133 acquires synchronization from a signal output from reception section 121, performs demodulation and decoding on the signal, and outputs the decoded signal to CPU 105 via CPU bus 132 and general bus 104.

CPU 105 functions as control means, and outputs a signal output from decoding section 133 to the outside, or outputs transmission data to coding section 134 in digital signal processing section 103 described later. Further, CPU 105 downloads programming data of another radio communication system to perform handover for switching to the another communication system during communications in some radio communication system, and stores the data in storage section 106 via general bus 104. Furthermore, CPU 105 reads out the stored programming data to reconfigure reconfigurable device 131. Reconfiguration will specifically be described later.

Coding section 134 encodes and modulates the transmission data output from CPU 105, and outputs the modulated signal to transmission section 122 in radio section 102. Transmission section 122 performs predetermined transmission processing (upconverting, D/A conversion, etc.) on the signal output from coding section 134, and transmits the signal to a communicating party station not shown via antenna section 101.

Storage section 106 stores the programming data. Interface 107 inputs/outputs data to/from communication apparatus 100 from/to the outside.

Radio communications are carried out in the aforementioned configuration. An example will be described below where digital signal processing section 103 is provided with reconfigurablility in a category of the baseband signal processing in mobile radio communications, and serves as a reconfigurable device specific to mobile radio communications, thereby eliminating the redundant flexibility and reducing the circuit scale of the digital signal processing section and programming data.

In the communication apparatus of the present invention, processing units are provided originally that are elements for common use in a plurality of radio communication systems, only set are connection information of connection between the internal processing units and control information, a reconfigurable device is mounted that serves the function of performing desired-system baseband signal processing, and it is thereby possible to decrease an amount of data to reconfigure, reduce the time required for download, and switch between communication systems for a short time.

For example, in the communication apparatus of the present invention, some function (for example, FFT) shared by different radio communication systems to use is not mounted for each of the radio communication systems, and various processing units to implement FFT are mounted originally.

Then, the communication apparatus of the present invention obtains the information (control information) to control processing units and information (connection information) to connect the processing units by programming from the outside, is thereby capable of being provided with FFT corresponding to a plurality of radio communication systems, thus designed to have a circuit scale as small as possible and programming data as little as possible, and reduces an amount of data required for reconfiguration. In addition, specific contents of the connection information and control information will be described later.

Figure 2:
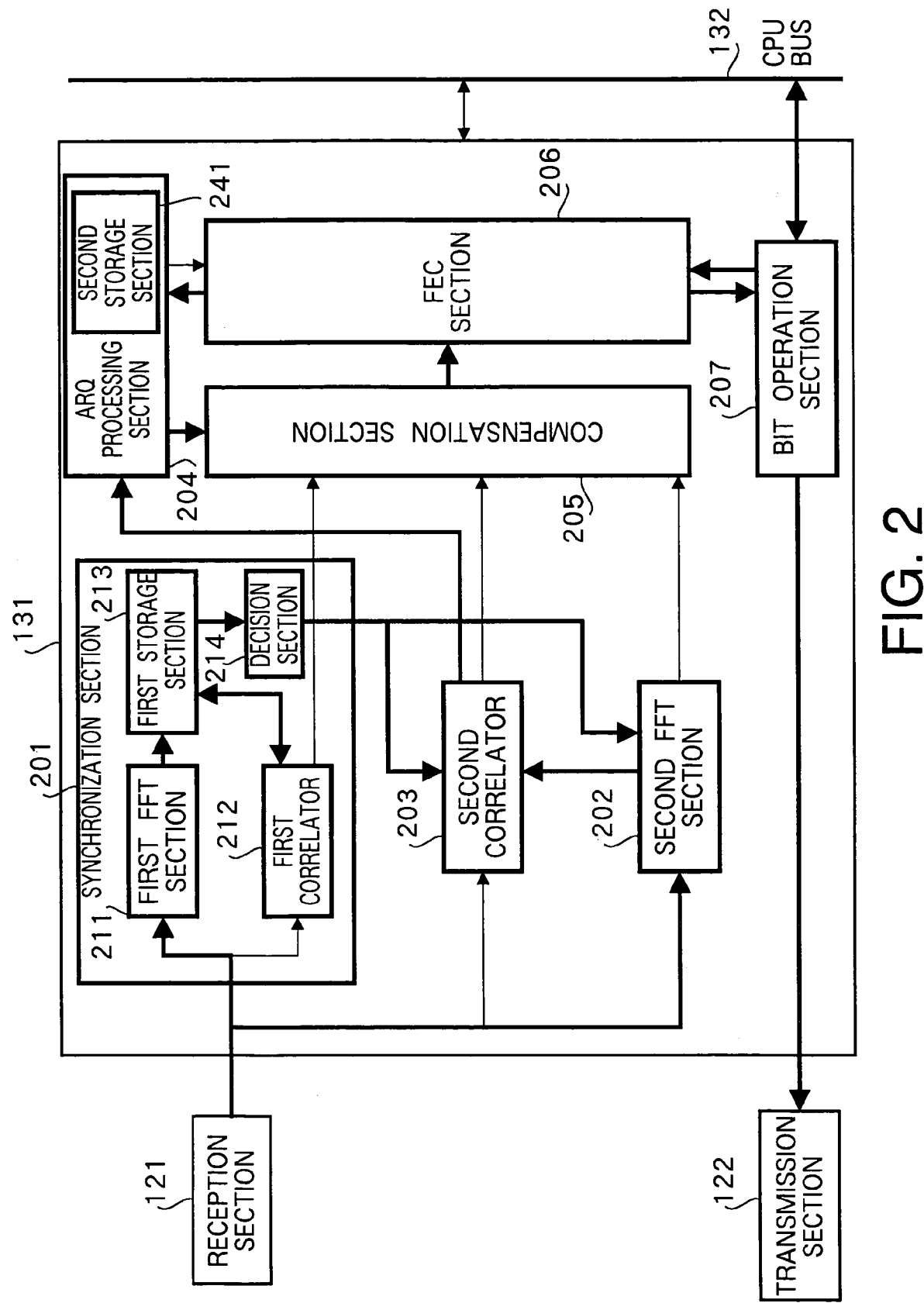
FIG. 2 is a block diagram illustrating a configuration of a reconfigurable device of the communication apparatus of the above Embodiment.

In this Embodiment, decoding section 133 will be described that is generally predominant in circuit scale among baseband signal processing. FIG. 2 is a block diagram illustrating a configuration of a reconfigurable device of the communication apparatus according to this Embodiment. Reconfigurable device 131 in FIG. 2 is mainly comprised of synchronization section 201, second FFT section 202, second correlator 203, ARQ processing section 204, compensation section 205, and FEC section 206.

Synchronization section 210 is mainly comprised of first FFT section 211, first correlator 212, first storage section 213, and decision section 214. ARQ processing section 204 has second storage section 241.

In FIG. 2, based on a signal output from reception section 121, synchronization section 201 acquires and tracks synchronization of a radio communication system, searches for another radio communication system as a destination of handover, and assigns a finger when necessary.

When an OFDM (Orthogonal Frequency Division Multiplexing) system is used as a modulation system, first FFT section 211 performs fast Fourier Transform (hereinafter, referred to as FFT) on a reception signal, and stores FFT results in first storage section 213. Decision section 214 performs comparison operation on the data stored in first storage section 213 to search for a synchronization symbol that is known information, acquires symbol synchronization, and outputs the synchronization timing information to second FFT section 202.

Meanwhile, when a CDM (Code Division Multiplex) system is used as a modulation system, first correlator 212 performs correlation operation of a reception signal with a known signal sequence, and stores correlation results in first storage section 213. Decision section 214 searches for a greatest value and maximum value of data stored in first storage section 213, acquires frame synchronization and spreading code number, and outputs the synchronization timing information and spreading code number to second correlator 203.

In particular, under multi-path propagation circumstances, a number of maximum values appear in stored correlation results (delay profile) and are called fingers, and there is a case of providing timing information of each of the fingers also to second correlator 203.

Further, in the case of a system where OFDM and CDM are combined, synchronization is acquired in combining both systems.

For example, first FFT section 211 executes FFT, and stores FFT results in first storage section 213, decision section 214 acquires symbol synchronization and outputs the synchronization timing information to second FFT section 202, and first correlator 212 also receives the stored data, performs correlation operation with a known signal sequence, and stores correlation results in first storage section 213.

Decision section 214 searches the stored data for a greatest value and maximum value, acquires frame synchronization and spreading code number, and outputs the synchronization timing information and spreading code number to second correlator 203.

In addition, even synchronization is acquired once, in particular, in the communication apparatus, or when a base station is moving, since radio signal propagation environments vary every instant and synchronization is lost, it is necessary to track synchronization by performing the procedures of synchronization acquisition at regular time intervals, or the like.

Further, there is a case of acquiring synchronization of a handover destination while keeping current communications.

Based on the synchronization timing information output from synchronization section 201, second FFT section 202 performs FFT operation of a reception channel signal output from reception section 121.

According to the synchronization timing information and spreading code number output from synchronization section 201, second correlator 203 performs correlation operation of a reception channel signal output from reception section 121 or second FFT section 202. Whether to receive the signal from reception section 121 or second FFT section 202 is set as connection information in reconfiguration.

Compensation section 205 calculates a phase rotation amount and an amplitude distortion value of a signal input from first correlator 212, second correlator 203, second FFT section 202 or ARQ processing section 204 using a known signal (pilot signal), and performs complex multiplication on the input signal using the calculated phase rotation amount and amplitude distortion value to make a phase correction and amplitude correction. Whether to receive the signal to process from first correlator 212, second correlator 203, second FFT section 202 or ARQ section 204 is set as connection information in reconfiguration.

Further, at the time of M-ary modulation with an M-ary number of $2^n$ (n is an integer of three or more) such as 16 QAM and 64 QAM, conversion to n items of data is also performed on complex symbol data subjected to the phase correction and amplitude correction, for example, using a lookup table. In addition, a value of n is set as control information in reconfiguration.

FFT section 206 performs error correcting processing such as Viterbi decoding and Turbo decoding on the data input from compensation section 205 or ARQ section 204. FEC section 206 outputs an operation result to bit operation section 207.

According to circumstances, FEC section 206 receives an operation result of bit operation section 207, and determines whether to perform FEC processing again. Further, when determining that an error is not corrected as a result of the FEC processing, the section 206 instructs ARQ processing section 204 to hold the reception data. According to circumstances, FEC section 206 outputs data to hold to ARQ processing section 204.

Information set in reconfiguration includes the type of FEC such as Viterbi decoding or Turbo decoding as control information, whether to receive the signal from compensation section 205 or ARQ processing section 204 as connection information, whether or not to receive the operation result from bit operation section 207 as connection information, and further, as control information, other information such as a value of constraint length, generator polynomial, an input data length and output data length.

ARQ processing section 204 stores in second storage section 241 the data input from second correlator 203 or FEC section 206, and determines whether or not to hold the stored data according to an instruction from FEC section 206. When holding the data, ARQ section 204 outputs the data together with data to receive in a next frame to compensation section 205 or FEC section 206.

Whether to receive the data from second correlator 203 or FEC section 206 and whether to output the data to compensation section 205 or FEC section 206 is set as control information in reconfiguration.

Bit operation section 207 performs error detecting processing by CRC operation and descrambling by descrambling processing on a bit sequence input from FEC section 206, or subjects a bit sequence input form CPU bus 132 to bit operation processing such as generation of parity bit by CRC operation, scrambling processing for scrambling data, and error correcting code processing such as convolutional code and Turbo code. The details of the operation are set as connection information in bit operation section 207 in reconfiguration.

Figure 3:
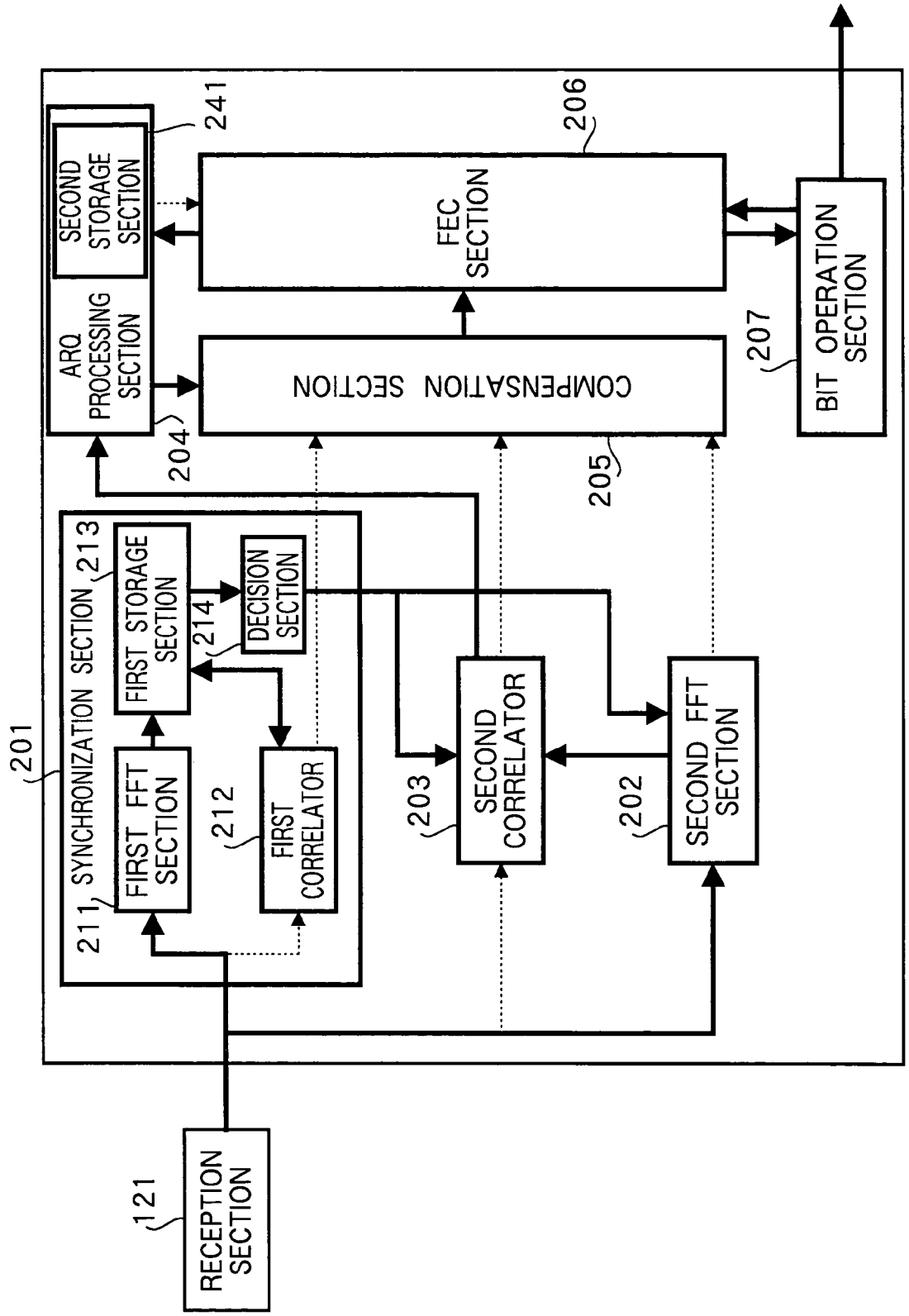
FIG. 3 is a block diagram illustrating a configuration of the reconfigurable device of the communication apparatus of the above Embodiment.
Figure 4:
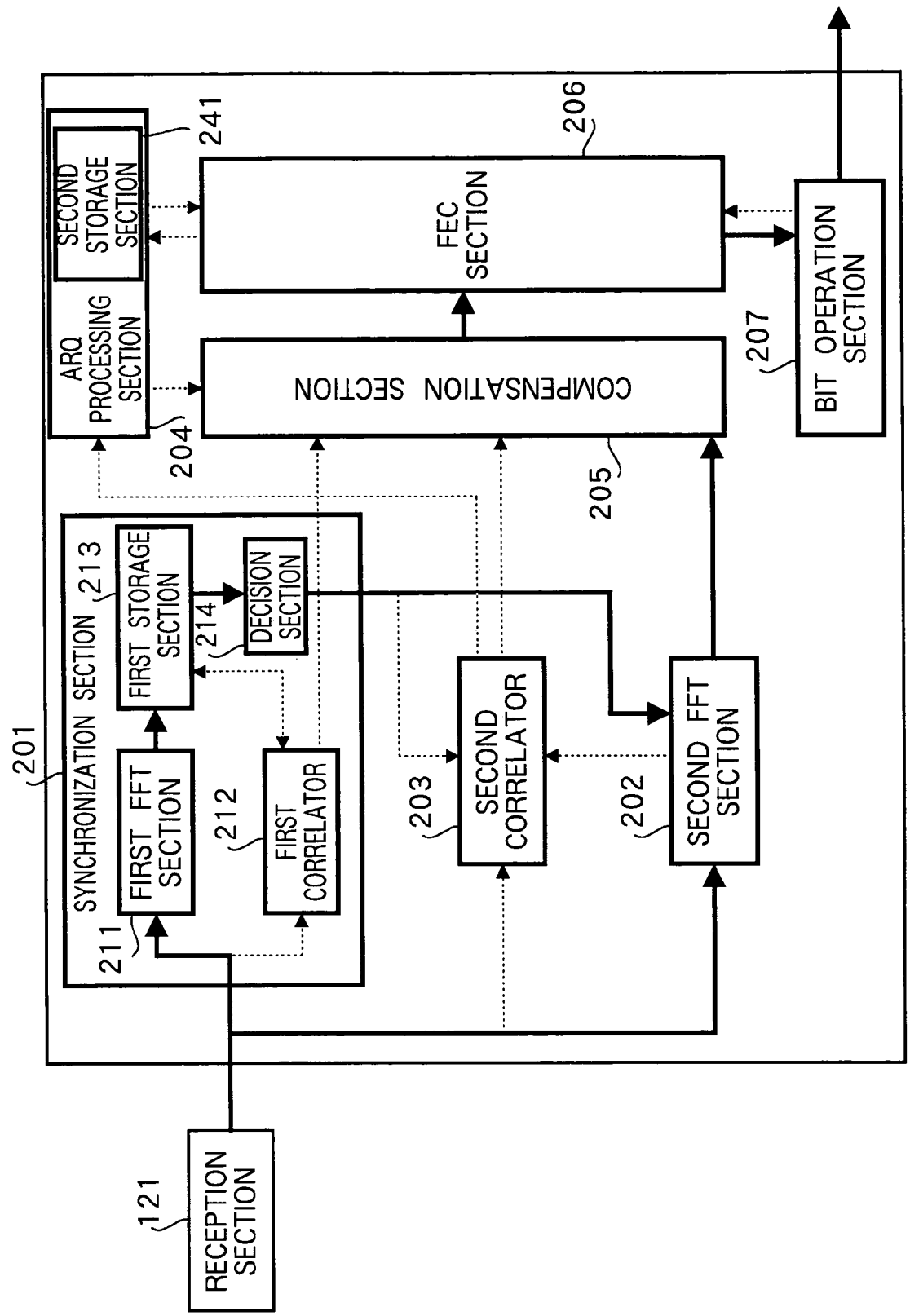
FIG. 4 is a block diagram illustrating a configuration of the reconfigurable device of the communication apparatus of the above Embodiment.
Figure 5:
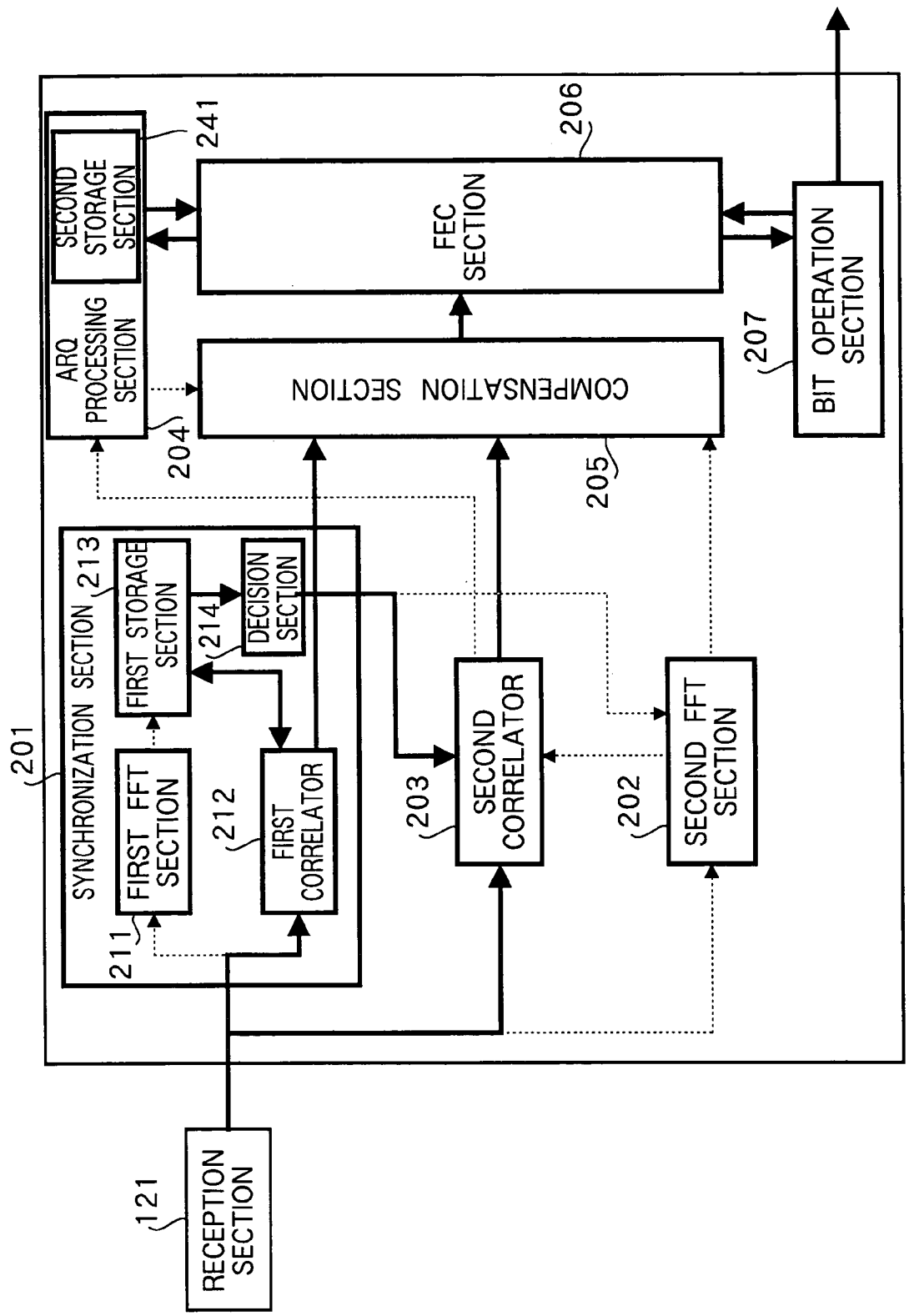
FIG. 5 is a block diagram illustrating a configuration of the reconfigurable device of the communication apparatus of the above Embodiment.

With reference to FIGS. 3, 4 and 5, a case will be described below of reconfiguring the digital signal processing section with the aforementioned configuration according to a radio communication system. FIGS. 3, 4 and 5 are block diagrams illustrating a configuration of the reconfigurable device of the communication apparatus of this Embodiment. FIG. 3 illustrates the digital signal processing section configured in the first radio communication system. In the figure, the section is reconfigured using function blocks shown by boldface. With respect to wiring shown by dotted lines, function blocks are not connected. Accordingly, all the functions are used in FIG. 3.

FIG. 4 illustrates the digital signal processing section configured in the second radio communication system. In the figure, the section is reconfigured using devices shown by boldface. Accordingly, in FIG. 4, since first correlator 212, second correlator 203 and ARQ processing section 204 are not used, the connection between the sections is canceled and clock and power supply to the sections is halted.

FIG. 5 illustrates the digital signal processing section configured in the third radio communication system. In the figure, the section is reconfigured using devices shown by bold face. Accordingly, in FIG. 5, since first FFT section 211 and second FFT section 202 are not used, the connection between the sections is canceled and clock and power supply to the sections is halted.

Thus, according to the communication apparatus of this Embodiment, only function blocks required for each radio communication system are used, connection between unused function blocks is canceled, and clock and power supply to the blocks is halted. It is thereby possible to reduce power consumption.

Figure 6:
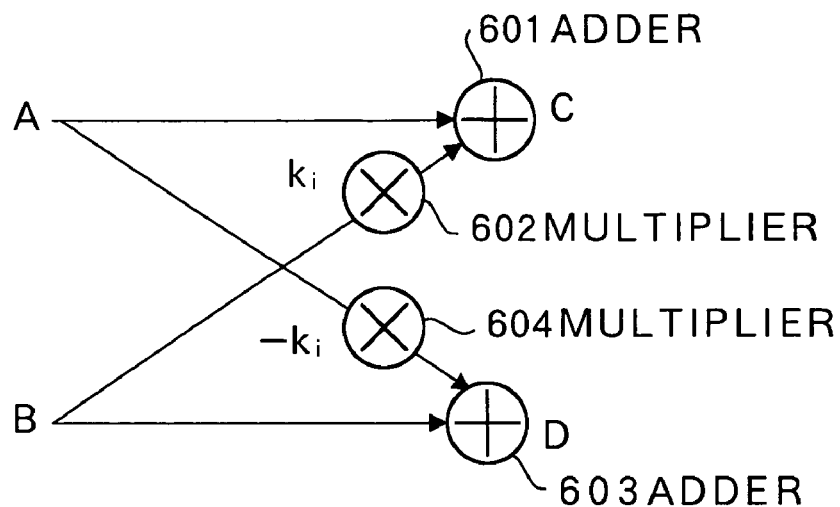
FIG. 6 is a diagram illustrating an internal configuration of an FFT section of the above Embodiment.

Herein is described each function block shared by different radio communication systems to use. For example, by comparing FIG. 3 with FIG. 4, it is understood that first FFT section 211 and second FFT section 202 are used in both figures. However, specifications of the number of samples are different even in the same FFT section. Therefore, different portions in an internal configuration of FFT are only reconfigured. FIG. 6 is a diagram illustrating an internal configuration of the FFT section of this Embodiment.

First FFT section 211 and second FFT section 202 have a plurality of butterfly processing units as shown in FIG. 6. For example, using as a basic element the butterfly processing unit comprised of two multipliers, 602 and 604, and two adders, 601 and 603, as shown in FIG. 6, $N/2 \times \log_2 N$ butterfly processing units are combined to implement N-point FFT.

Figure 7:
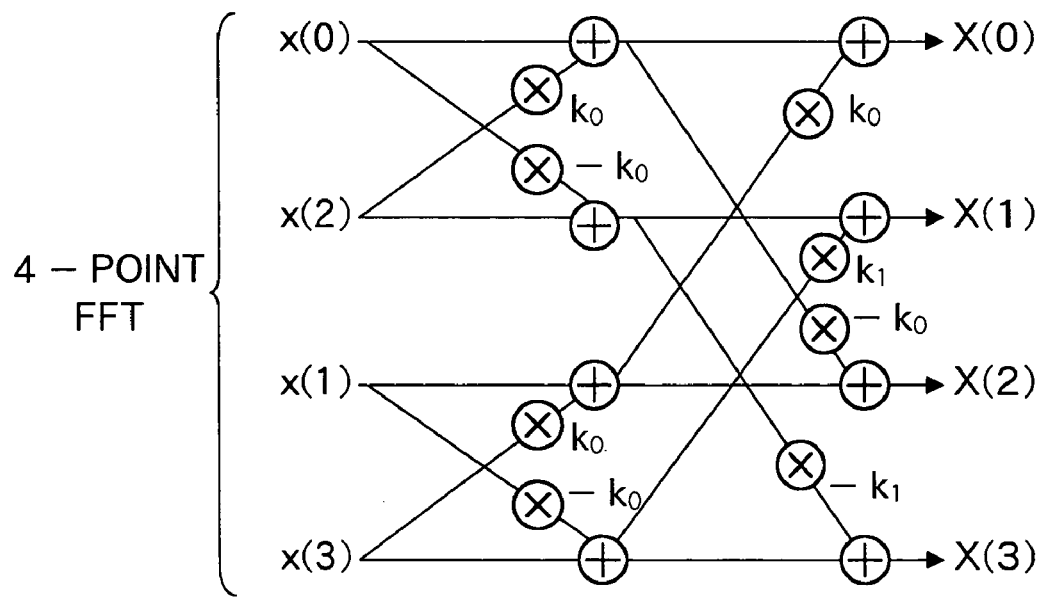
FIG. 7 is a diagram illustrating an example of an internal configuration of the FFT section in 4-point FFT.

As an example, 4-point FFT and 8-point FFT will be described below. FIG. 7 is a diagram illustrating an example of the internal configuration of the FFT section at the time of 4-point FFT. 4-point FFT is implemented by using four ($=4/2 \times \log_2 4$) butterfly processing units and connecting the processing units as shown in FIG. 7.

Figure 8:
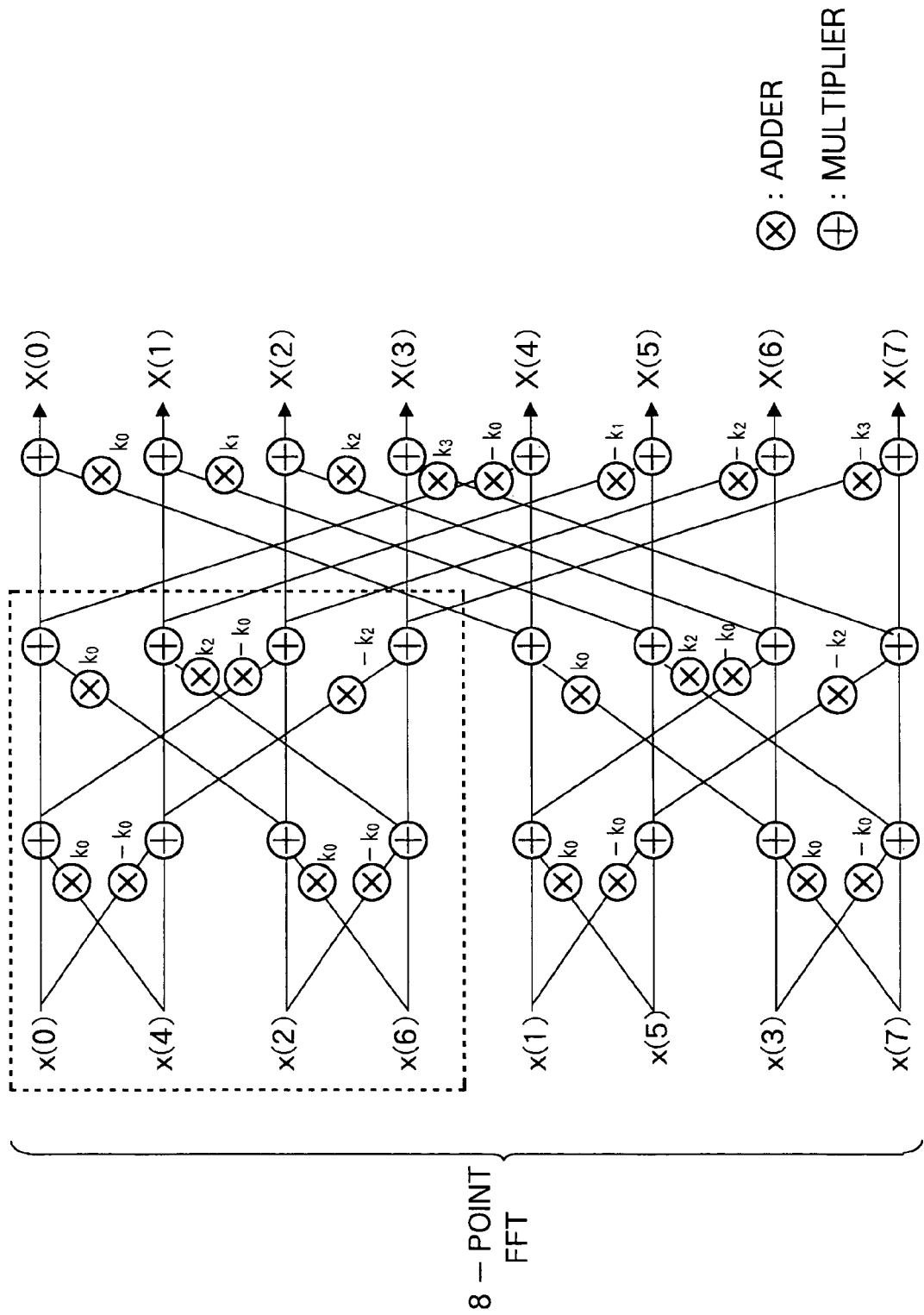
FIG. 8 is a diagram illustrating an example of an internal configuration of the FFT section in 8-point FFT.

FIG. 8 is a diagram illustrating an example of the internal configuration of the FFT section at the time of 8-point FFT. 8-point FFT is implemented by using twelve ($=8/2 \times \log_2 8$) butterfly processing units and connecting the processing units as shown in FIG. 8.

Herein, attention to a dotted portion in FIG. 8 reaches that the portion is the same as in FIG. 7. In other words, N-point FFT includes $N/2^n$ (n is an integer of one or more) FFT. Using this property, butterfly processing units are provided in advance according to the larger number of samples among radio communication systems using FFT, and connected corresponding to the number of samples of a radio communication system in reconfiguration, thereby implementing the shared use.

Accordingly, as the information set in reconfiguration, the number of samples is input as control information.

Further, $k_i$ in FIG. 6 represents $\exp(-j2\pi i/N)$ in N-point FFT, and is determined uniquely by the number of samples, N. Herein, i represents an integer of $0 \leq i \leq N/2-1$, and j represents the imaginary part ($j^2 = -1$).

In addition, as another method, such a method is considered that only 4-point FFT is mounted, and operated three times in 8-point FFT, in other words, processing units are prepared according to the smaller number of samples among radio communication systems to use, and in the larger number of samples, FFT is executed several times in time division to implement.

Further, it may be possible that two-point FFT (butterfly processing unit) is only mounted, and operated four times in 4-point FFT, while being operated eight times in 8-point FFT, in other words, a basic configuration smaller than that in any radio communication system is provided and operated a plurality of times in each radio communication system. Thus, in the communication apparatus of the present invention, portions shared by FFT are not reconfigured, and the other portions are reconfigured.

Thus, according to the communication apparatus of this Embodiment, by reconfiguring processing portions varying with the number of items of data to perform orthogonal transform, it is possible to decrease an amount of data to reconfigure, reduce the time required for download, and switch between communication systems for a short time.

Figure 9:
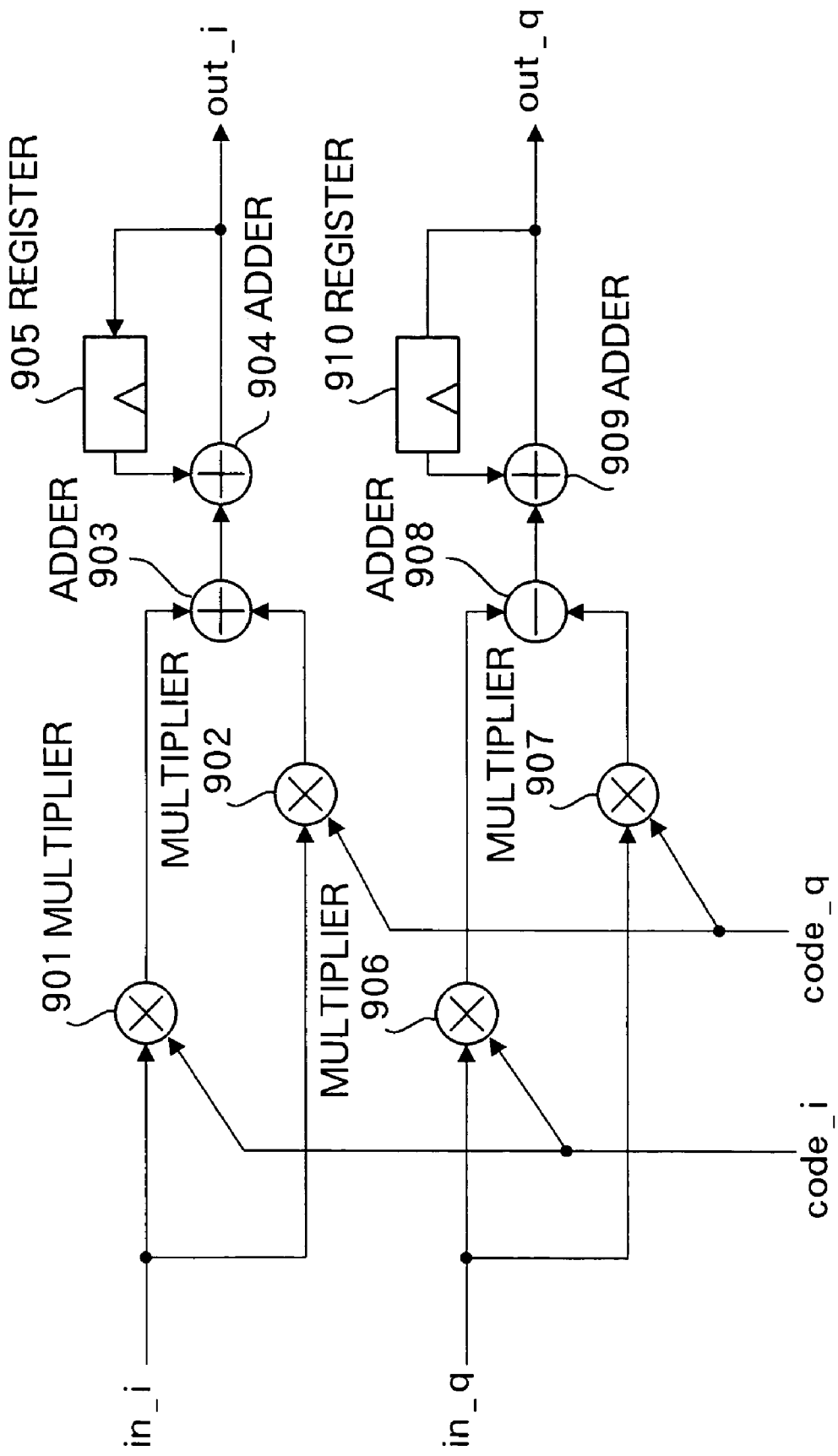
FIG. 9 is a block diagram of a correlator in the case of QPSK as an example.

Similarly, by comparing FIG. 3 with FIG. 5, it is understood that first correlator 212 and second correlator 203 are used in both figures. FIG. 9 is a block diagram of a correlator in the case of QPSK as an example. In FIG. 9, input signals in_i and in_q are multiplied by spreading signal sequences code_i and code_q in multipliers 901, 902, 906 and 907. Multiplier 901 multiplies in_i by code_i. Multiplier 902 multiplies in_i by code_q. Multiplier 906 multiplies in_q by code_i. Multiplier 907 multiplies in_q by code_q.

Adder 903 receives results of multipliers 901 and 902 to add. Adder 908 receives results of multipliers 906 and 907 to subtract. Adder 904 receives outputs of register 905 with an initial value of zero and of adder 903 to add, and stores the result in register 905. Adder 909 receives outputs of register 910 with an initial value of zero and of adder 909 to add, and stores the result in register 910.

By performing a series of such operation repeatedly by a length of the spreading signal sequence, as a result of the operation, correlation values out_i and out_q are respectively output from adders 904 and 909.

In addition, by regarding spreading signal sequence code code_q as zero, such a configuration can be used in BPSK. In this way, even when QPSK is used in the first radio communication system, while BPSK is used in the third radio communication system, correlators are shared by setting the type of modulation as control information in reconfiguration.

Thus, according to the communication apparatus of this Embodiment, by reconfiguring the connection between processing units without reconfiguring the processing units, it is possible to decrease an amount of data to reconfigure, reduce the time required for download, and switch between communication systems for a short time.

Further, for simplicity in descriptions, the case of QPSK and BPSK is explained as an example, but it is possible to share processing units by providing modifications as appropriate even when other systems are used as a modulation system.

Figure 10:
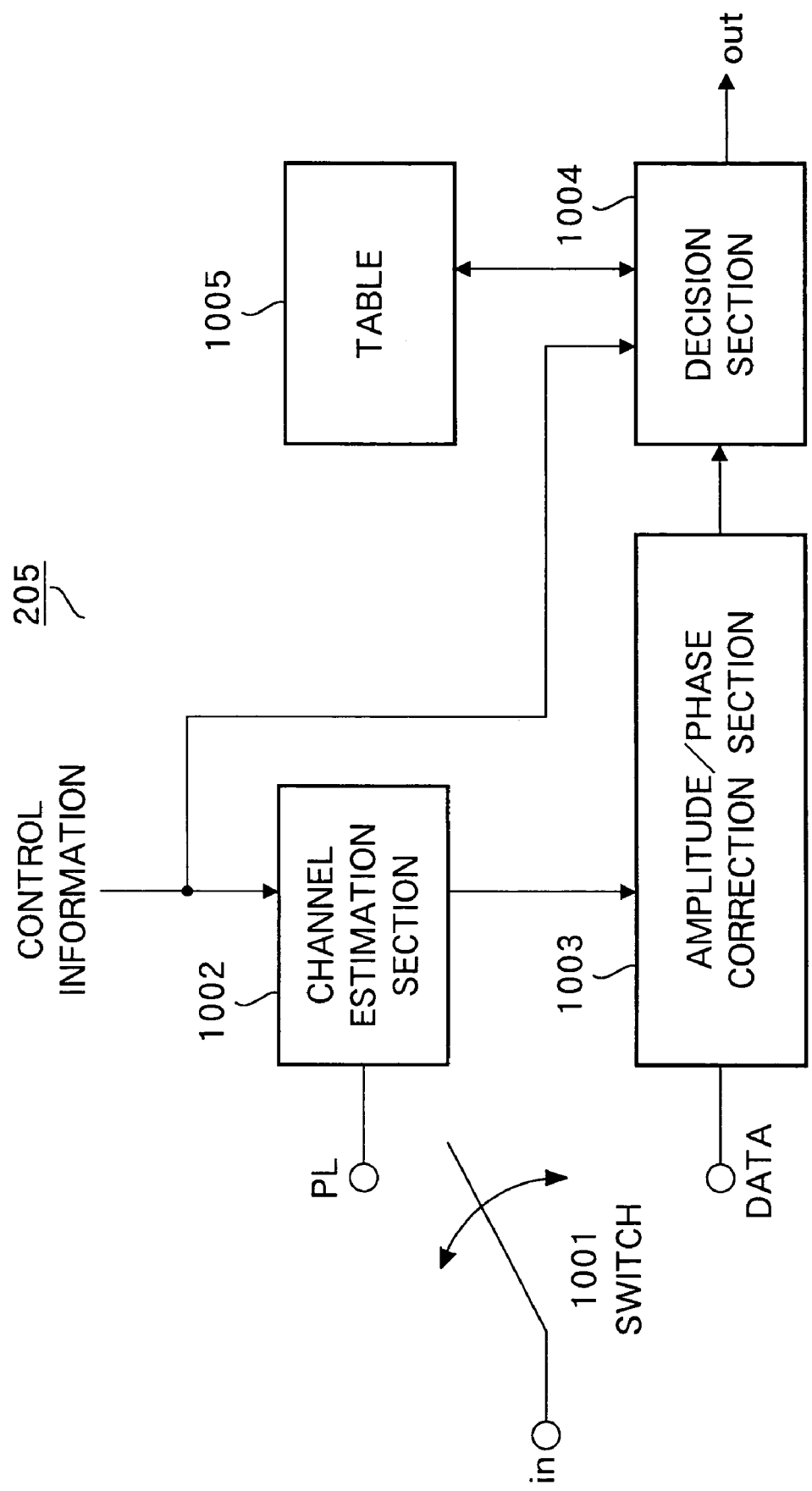
FIG. 10 is a diagram illustrating an internal configuration of a compensation section of the communication apparatus of the above Embodiment.

FIG. 10 is a diagram illustrating an internal configuration of the compensation section of the communication apparatus of this Embodiment. Compensation section 205 in FIG. 1 supports various modulation systems such as QPSK and QAM. FIG. 10 illustrates a configuration of compensation section 205.

Input data "in" is input to switch 1001. When the data is of a known signal, switch 1001 is connected to the PL side, and the data is input to channel estimation section 1002. Meanwhile, when input data "in" is not of a known signal, switch 1001 is connected to the DATA side, and the data is input to amplitude/phase correction section 1003.

Channel estimation section 1002 receives the type of modulation and a theoretical value of the known signal as the control information, compares the input known signal with the theoretical value to determine an amount of phase rotation and a degree of amplitude distortion based on the control information, and thereby derives a phase correction amount and amplitude correction amount to output to amplitude/phase correction section 1003.

Amplitude/phase correction section 1003 corrects the amplitude and phase of the input data using the input amplitude correction amount and phase correction amount to output to decision section 1004. Decision section 1004 receives the type of modulation as the control information, reads out a table value from the input data using table 1005 at the time of QAM, and calculates output data "out". At the time of QPSK, the section 1004 outputs the data without any processing. In addition, amplitude/phase correction section 1003 may be provided with equalizing function and/or RAKE reception function.

As described above, it is possible to share compensation section 205 by setting the type of modulation and theoretical value as the control information in reconfiguration.

In addition, at the time of BPSK modulation, it is not necessary to perform phase correction in particular, and only amplitude correction may be made when necessary.

Figure 11:
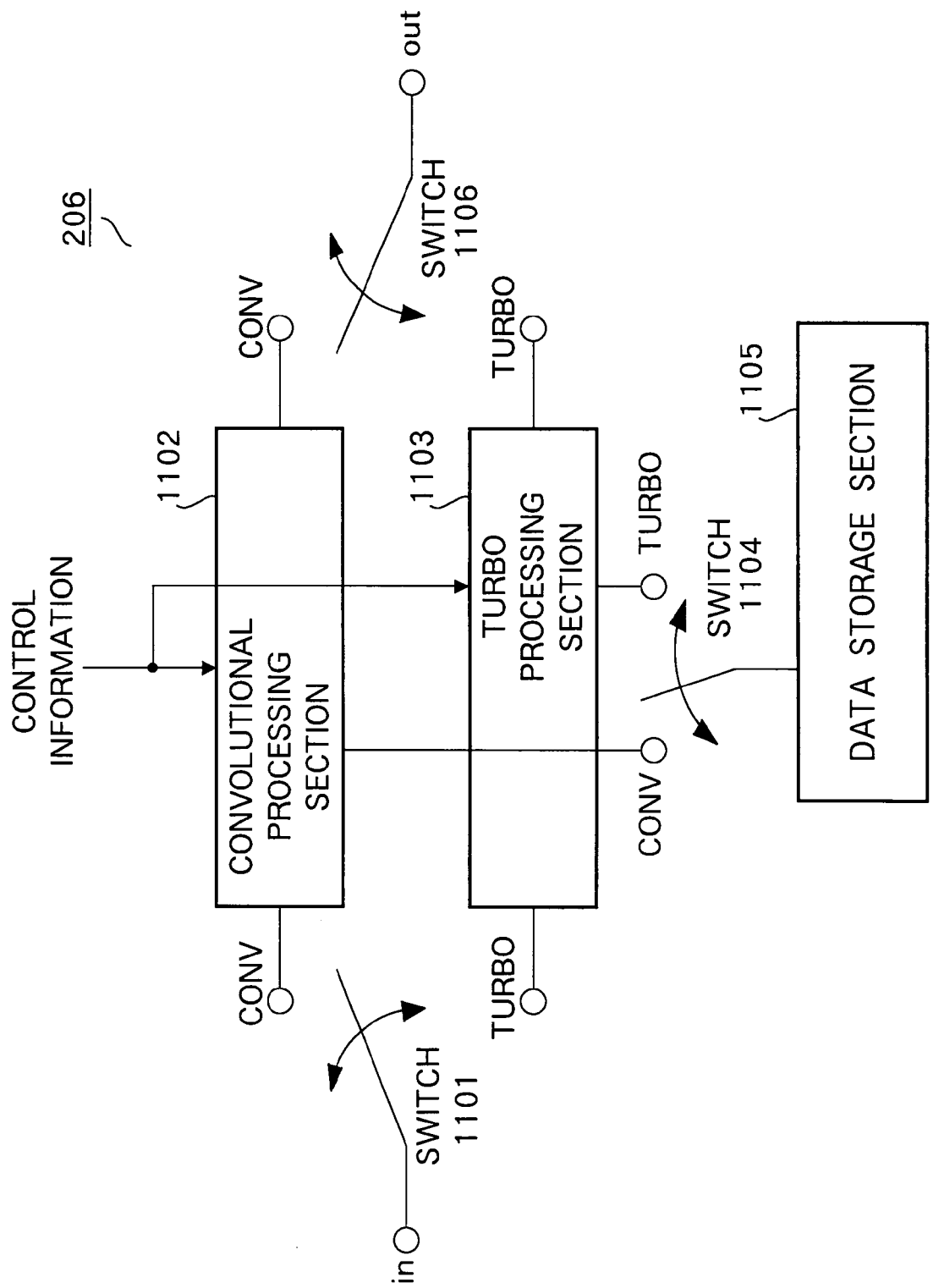
FIG. 11 is a diagram illustrating an internal configuration of an FEC section of the communication apparatus of the above Embodiment.

Decoding processing will be described below. FIG. 11 is a diagram illustrating an internal configuration of the FEC section of the communication apparatus of this Embodiment.

FEC section 206 performs error correction on reception data coded in various manners such as convolutional code and Turbo code. FIG. 11 illustrates the configuration of FEC section 206. Input data "in" is connected to switch 1101, and switch 1101 is connected to convolutional processing section 1102 at the time of convolutional code, while being connected to Turbo processing section 1103 at the time of Turbo code. Data storage section 1105 is connected to switch 1104, and switch 1104 is connected to convolutional processing section 1102 at the time of convolutional code, while being connected to Turbo processing section 1103 at the time of turbo code.

Convolutional processing section 1102 and Turbo processing section 1103 receive control information such as a generator polynomial, constraint length, data length and request flag, determine whether to operate from the request flag, and when determining to operate, start error correcting processing of the input data based on the input control information.

According to circumstances, intermediate data such as, for example, path metric and path history is input/output to/from data storage section 1105 during the operation. Meanwhile, when the operation is not carried out, unnecessary current consumption is interrupted by shutting down the clock and power supply.

Switch 1106 is connected at its two inputs to an output of convolutional processing section 1102 and an output of Turbo processing section 1103, connected to convolutional processing section 1102 at the time of convolutional code, while being connected to Turbo processing section 1103 at the time of Turbo code, and outputs error corrected data as output data "out".

By this means, FEC section 206 can be shared by setting in reconfiguration the setting of switches 1101, 1104 and 1106 as connection information, and information such as a generator polynomial, constraint length, data length and request flag as control information.

The operation of ARQ processing section 204 will be described below. ARQ processing section 204 is used in the first radio communication system and third radio communication system, and receives an output of second correlator 203 to store in second storage section 241. The stored data of a single frame is output to compensation section 205 in the first radio communication system, subjected to amplitude/phase correction in compensation section 205, and output to FEC section 206.

The data is directly output to FEC section 206 in the third radio communication system. FEC section 206 performs error correcting processing on the data, and outputs error corrected data to bit operation section 207. Bit calculation section 207 performs error detecting check by CRC, and outputs the result to FEC section 206.

When an error still remains, FEC section 206 performs error correction again, and outputs the error corrected data to bit operation section 207 again. After repeating a series of such processing a predetermined number of times, when determining that the error is not corrected, FEC section 206 outputs a retransmission request. Upon receiving a retransmission request signal from FEC section 206, second storage section 241 keeps the stored data, and when completing the storage of next-frame data, outputs the stored data of a few frames to compensation section 205 or FEC section 206.

Meanwhile, when FEC section 206 determines that errors are all corrected, the section 206 does not output a retransmission request. In this case, second storage section 241 does not keep the stored data.

Figure 12:
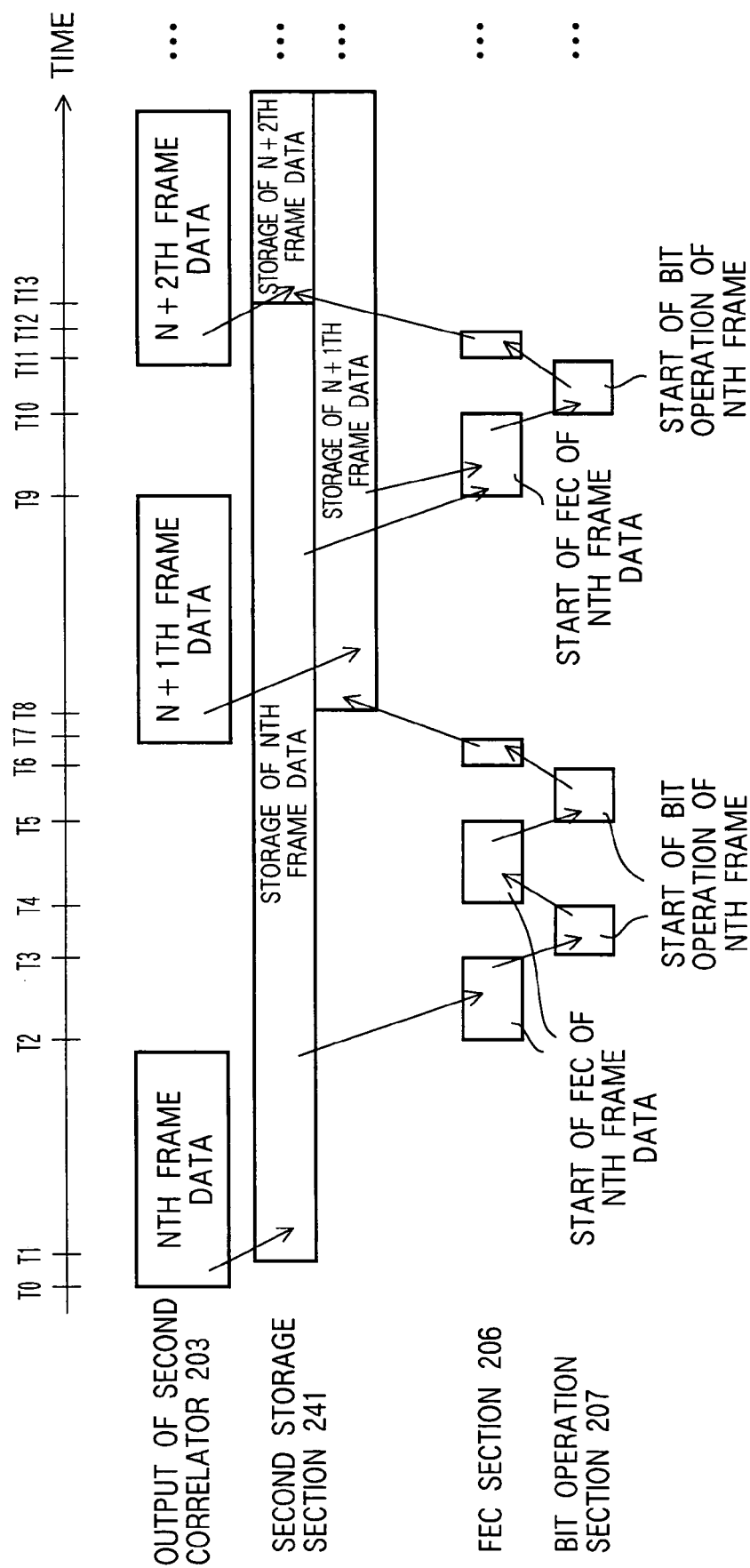
FIG. 12 is a flow diagram illustrating an example of the operation when retransmission is requested in the communication apparatus of the above Embodiment.
Figure 13:
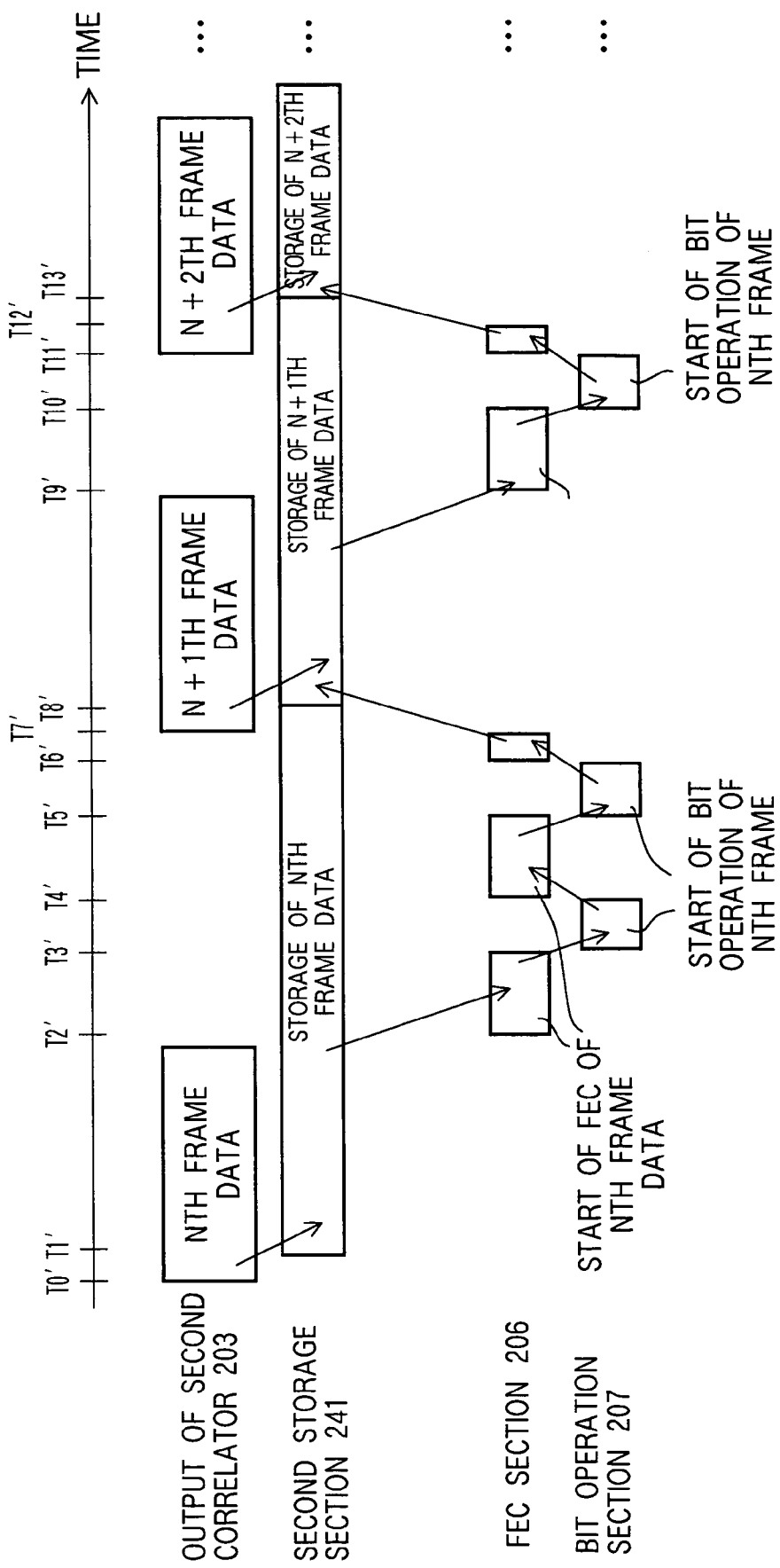
FIG. 13 is a flow diagram illustrating an example of the operation when retransmission is not requested in the communication apparatus of the above Embodiment.

As an example, FIG. 12 illustrates a flow of data when retransmission is requested, while FIG. 13 illustrates a flow of data when retransmission is not requested. In this example, the number of maximum repetitions is two. FIG. 12 is a flow diagram illustrating an example of the operation when retransmission is requested in the communication apparatus of this Embodiment. FIG. 13 is a flow diagram illustrating an example of the operation when retransmission is not requested in the communication apparatus of this Embodiment.

In FIG. 12, second correlator 203 outputs Nth frame data from time T0, and starts storing the Nth frame data in second storage section 241 from time T1. Storage section 241 outputs the stored Nth frame data to FEC section 206 at time T2. FEC section 206 executes error correcting processing.

FEC section 206 outputs error corrected data to bit operation section 207 at time T3. Bit operation section 207 executes error detection by CRC operation, and reports an error detection result to FEC section 206 at time T4.

When FEC section 206 determines that an error exists from the input error detection result, the section 206 executes the error correcting processing again, and outputs error corrected data to bit operation section 207 again at time T5. Bit operation section 207 executes error detection again by CRC operation, and reports an error detection result to FEC section 206 at time T6.

When FEC section 206 determines that an error exists from the input error detection result, since the error is not corrected even after executing the error correcting processing twice that is the predetermined number of times, the section 206 outputs a retransmission request.

Meanwhile, second correlator 203 outputs N+1th frame data from time T7, and second storage section 241 starts storing the N+1th frame data from time T8. Since retransmission is requested, storage section 241 stores the data in another location while keeping the previously stored Nth frame.

Second storage section 241 outputs the Nth frame data and N+1th frame data to FEC section 206 at time T9. FEC section 206 executes the error correcting processing, and outputs error correction processed data to bit operation section 207 at time T10. Bit operation section 207 executes the error detection by CRC operation, and reports an error detection result to FEC section 206 at time T11.

When FEC section 206 determines that an error does not exist from the input error detection result, the section 206 does not request retransmission. Second correlator 203 outputs the N+2th frame data at time T12, and second storage section 241 starts storing the N+2th frame data from time T13. Since retransmission is not requested, the section 241 overwrites previously stored data, i.e. the Nth frame data in this example.

In FIG. 13, time T0' to time T6' is the same as in the example in FIG. 12. When FEC section 206 determines that an error does not exist from the input error detection result at time T6', the section 206 does not request retransmission. Meanwhile, second correlator 203 outputs the N+1 frame data from time T7', and second storage section 241 starts storing the N+1 frame data from time T8', and overwrites the previously stored data, i.e. the Nth frame data in this example because retransmission is not requested. The subsequent flow is the same as in FIG. 12.

In addition, for the sake of convenience, it is described in this Embodiment that FEC section 206 outputs a retransmission request, but the present invention is not limited to the foregoing. CPU 105 may determine, for example, from a CRC result in bit operation section 207, or bit operation section 207 may determine.

Further, ARQ processing section 204 can be shared by setting whether ARQ processing section 204 receives stored data from second correlator 203 or FEC section 206 and outputs the data to compensation section 205 or FEC section 206, as connection information in reconfiguration.

Thus, according to the communication apparatus of this Embodiment, by reconfiguring only a portion of processing different between different error control systems, it is possible to decrease an amount of data to reconfigure, reduce the time required for download, and switch between communication systems for a short time.

The operation of bit operation section 207 will be described below. Bit operation section 207 is always used. It is assumed herein that the first and third radio communication systems use bit operation section 207 for CRC operation, and that the second radio communication system uses bit operation section 207 for descrambling processing. FIGS. 14, 15, 16 and 17 are block diagrams common to a CRC processing unit and a descramble processor. As viewed in either figure, the right side represents a higher-degree side, while the left side represents the lowest-degree side, and there are shown registers 1403-1 to 1403-$k$-1 to shift up from the lower-degree side to the higher-degree side.

Figure 14:
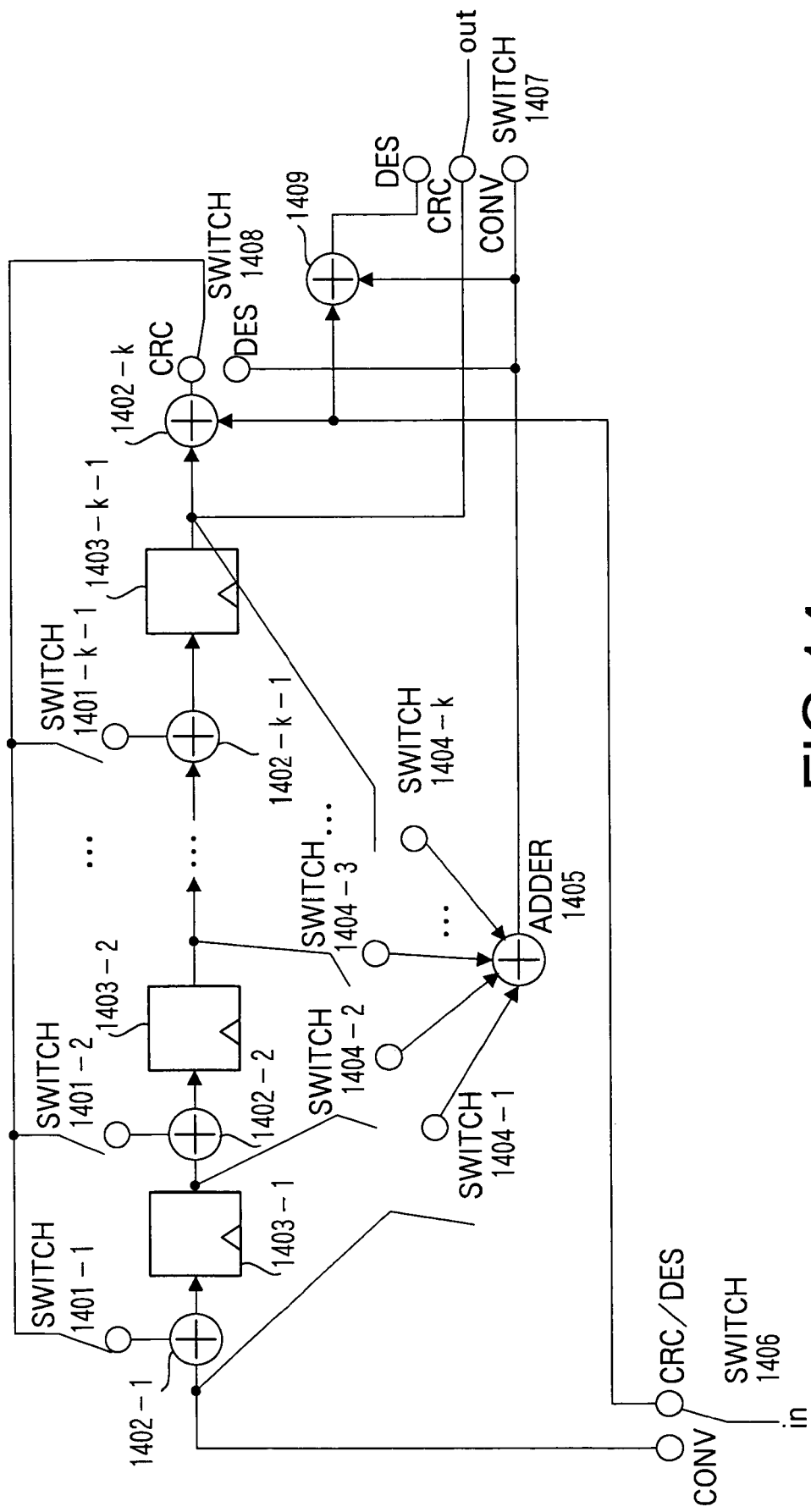
FIG. 14 is a block diagram common to a CRC processing unit and a descramble processor.

In FIG. 14, input data "in" is connected to switch 1406, and switch 1406 outputs the data to either the CONV side or the CRC/DES side. An output of the CONV side of switch 1406 is connected to switch 1404-1 and one input of adder 1402-1, the other input of adder 1402-1 is connected to an output of switch 1401-1, and an output of adder 1402-1 is input to register 1403-1.

An output of register 1403-1 is connected to switch 1404-2 and one input of adder 1402-2, the other input of adder 1402-2 is connected to an output of switch 1401-2, and an output of adder 1402-2 is input to register 1403-2. Similar connection is performed repeatedly until register 1403-$k$-1, and an output of register 1403-$k$-1 is connected to switch 1404-$k$, adder 1402-$k$ and the CRC side that is one of three inputs of switch 1407. The other input of adder 1402-$k$ is connected to the CRC/DES side of switch 1406. An output of adder 1402-$k$ is connected to the CRC side that is one of two inputs of switch 1408-2. Outputs of switches 1404-1 to 1404-$k$ are all input to adder 1405, an output of adder 1405 is connected to the DES side that is the other input of switch 1408, adder 1409, and the CONV side that is one of remaining two inputs of switch 1407.

An output of switch 1408 is connected to inputs of switches 1401-1 to 1401-$k$-1. The other input of adder 1409 is connected to the output CRC/DES side of switch 1406, and an output of adder 1409 is connected to the DES side that is the remaining one input of switch 1407. Output data "out" is obtained from an output of switch 1407.

Figure 15:
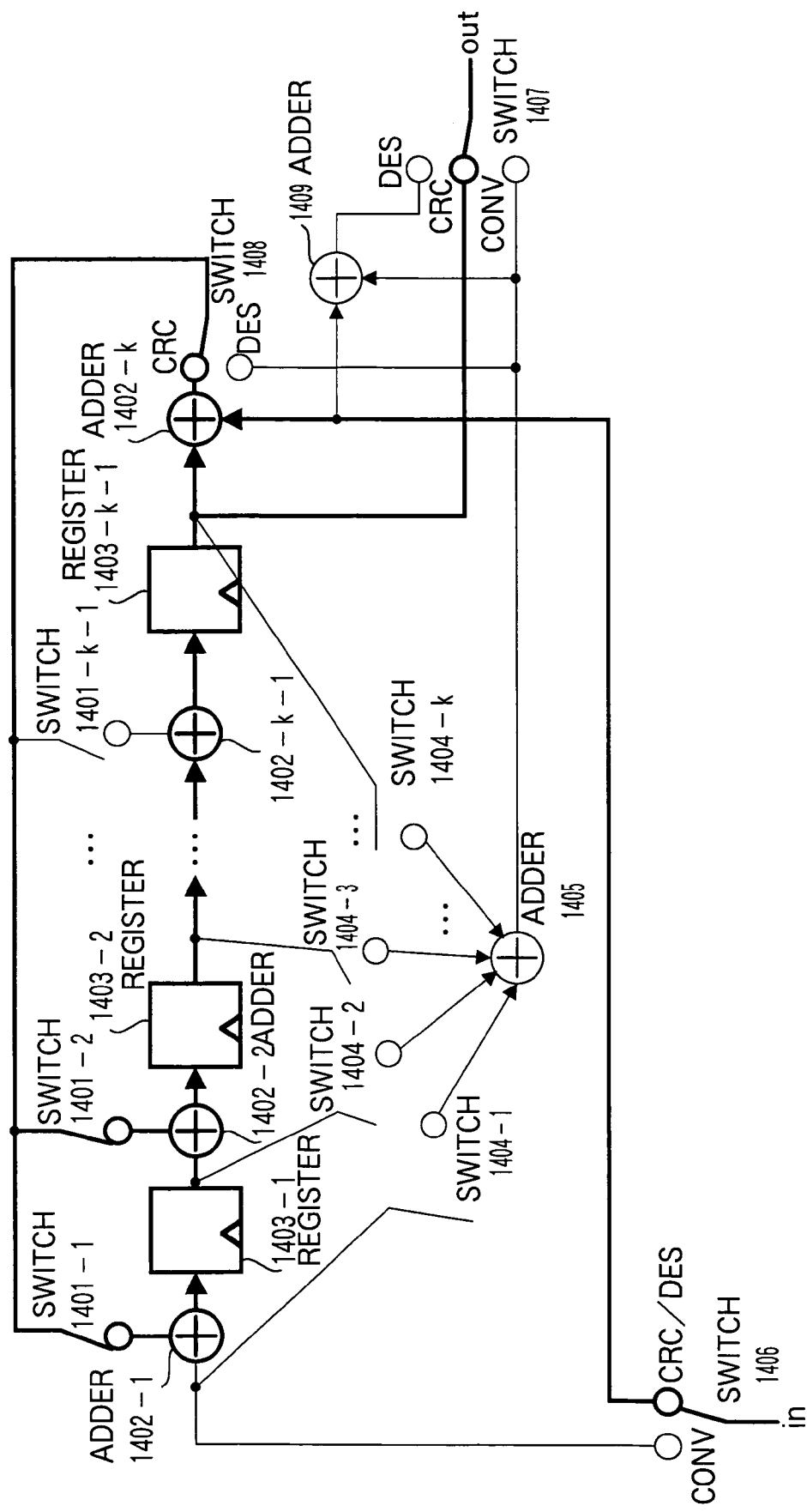
FIG. 15 is a block diagram common to a CRC processing unit and a descramble processor.

The case of CRC operation will be described below with reference to FIG. 15. FIG. 15 shows an example where a generator polynomial is $X^{k-1}+X+1$.

Switches 1404-1 to 1404-$k$ are all OFF. Among switches 1401-1 to 1401-$k$-1, any switch corresponding to a degree with a coefficient of "1" of the generator polynomial is ON, and the other switches are OFF.

In the case of this example, switches 1401-1 and 1401-2 are only ON. Switch 1408 is made to the CRC side, while switch 1406 is made to the CRC/DES side to input input data "in". Meanwhile, switch 1407 is made to the CRC side to output output data "out".

Figure 16:
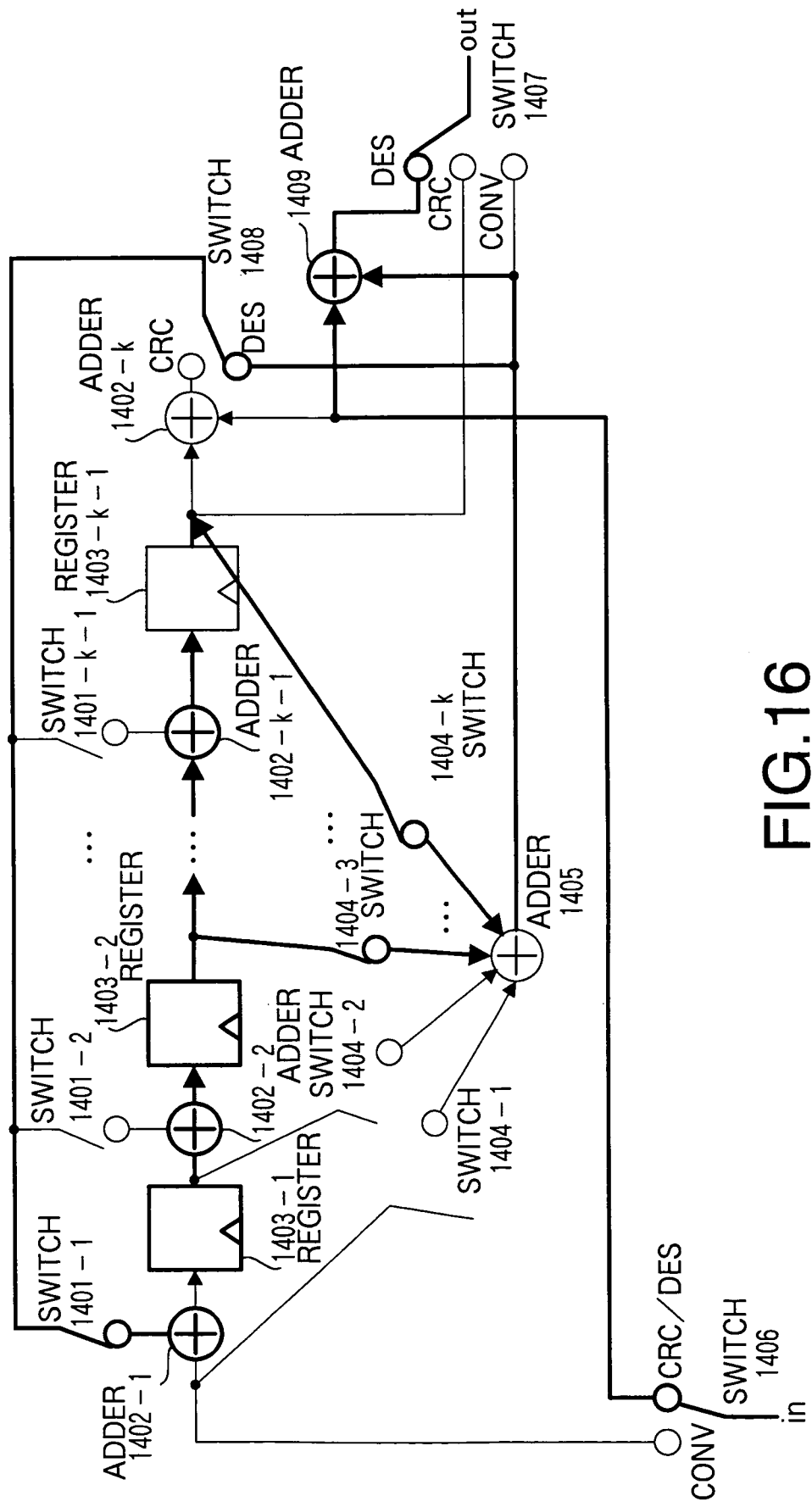
FIG. 16 is a block diagram common to a CRC processing unit and a descramble processor.

The case of descrambling processing will be described below with reference to FIG. 16. FIG. 16 shows an example where a generator polynomial is $X^{k-1}+X^2+1$.

Among switches 1401-1 to 1401-$k$-1, switch 1401-1 is only ON, while the other switches are OFF. Among switches 1404-2 to 1404-$k$, any switch corresponding to a degree with a coefficient of "1" of the generator polynomial is ON, and the other switches are OFF.

In the case of this example, switches 1404-3 and 1404-$k$ are only ON. In addition, switch 1404-1 is OFF. Switch 1408 is made to the DES side, while switch 1406 is made to the CRC/DES side to input input data "in". Meanwhile, switch 1407 is made to the DES side to output output data "out".

The connection examples of bit operation section 207 are also used as a CRC encoder or scrambler on the coding side.

Figure 17:
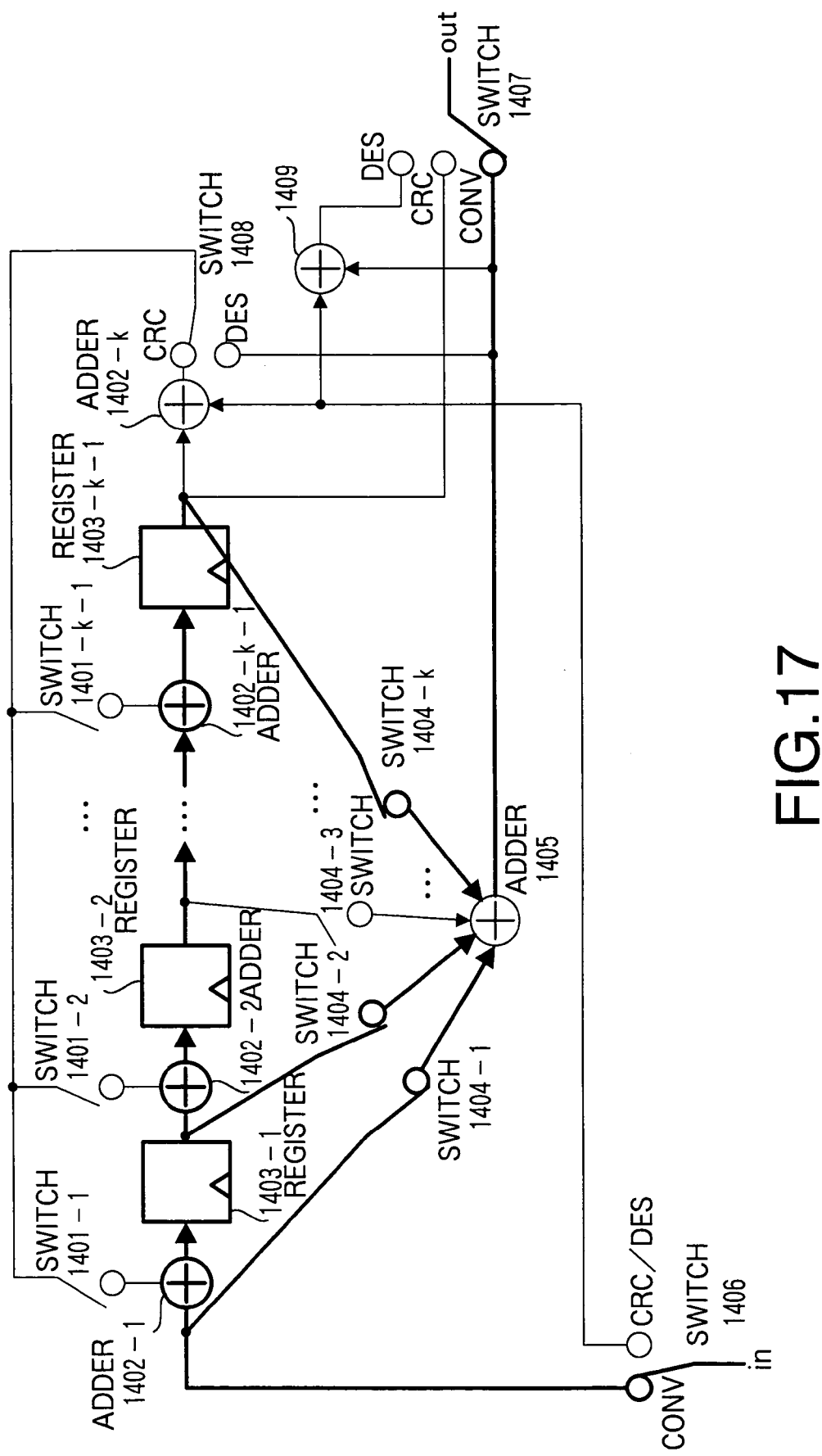
FIG. 17 is a block diagram common to a CRC processing unit and a descramble processor.

Further, bit operation section 207 is used as a convolutional encoder on the coding side. For example, FIG. 17 illustrates the case of convolutional code where a generator polynomial is $X^{k-1}+X+1$.

In other words, switches 1401-1 to 1401-$k$-1 are all OFF. Among switches 1404-1 to 1404-$k$, any switch corresponding to a degree with a coefficient of "1" of the generator polynomial is ON, and the other switches are OFF.

In the case of this example, switches 1404-1, 1404-2 and 1404-$k$ are only ON. Switch 1408 is not concerned. Switch 1406 is made to the CONV side to input input data "in". Meanwhile, switch 1407 is made to the CONV side to output output data "out". For simplicity, the descriptions explain the case of coding rate of 1/1. In the case of 1/n (n is an integer of two or more), by providing n series of switches 1404-1 to 1404-$k$ and adder 1405 in parallel, it is possible to generate n items of output data in response to a single item of input data "in" at a time.

As described above, bit operation section 207 can be shared by setting the setting of switches 1401-1 to 1401-$k$-1, 1404-1 to 1404-$k$, and 1406 to 1408 as connection information in reconfiguration.

Thus, according to the communication apparatus of this Embodiment, since specializing in mobile communications limits required processing, providing a required minimum reconfigurable device decreases redundant flexibility such as FPGA and PLC, and further setting the connection information and control information allows more flexible response than custom ASIC. Therefore, the need is eliminated for providing all the circuits for each radio communication system to support, and the circuit scale can be reduced. Further, only the connection information and control information is set as programming data, and it is thereby possible to reduce the download time.

In this way, as compared with conventional software radio apparatuses, the communication apparatus of this Embodiment is capable of downloading programming data of a large-scale radio communication system at high speed, and of performing handover between radio communication systems for a short time. Further, by this means, the need is eliminated for providing a dedicate channel to perform high-speed download and/or accommodating a large number of users in a wideband high-transmission rate radio communication system, and it is thus possible to avoid decreases in user capacity of the entire system.

This Embodiment describes about decoding section 133 that is generally predominant in circuit scale among the baseband signal processing. With respect to coding section 134, as shown in the example of convolutional operation, it is possible to implement by expanding bit operation section 207 as appropriate.

In addition, this Embodiment describes reconfigurable device 131 applied to the baseband signal processing in the communication apparatus, but the present invention is not limited thereto. The radio section, an application section (not shown) connected to CPU 105 or CPU 105 itself may be a reconfiguration device.

Further, this Embodiment describes the case that the communication apparatus downloads programming data of a radio communicating system of a handover destination to acquire, but the present invention is not limited thereto. Using interface 107 of the communication apparatus in FIG. 1 allows concurrent use of a storage medium such as an SD card, flash card, memory stick and disc, or allows concurrent use of download by wired connection using 100BASE-TA, 10BASE-T, USB, IEEE1394 or optical fiber (FTTH).

For example, via an ADSL modem and USB, it may be possible to select a wireless service provider on the internet, download programming data of a communication system of the selected wireless service provider, and reconfigure the communication apparatus to the communication system of a desired wireless service provider.

Further, with respect to download, it may be possible to perform download between the communication apparatus and access point in an area such as a hot spot in a hotel, airport or station, substituting general specific power-saving wireless communications such as wireless LAN typified by IEEE802.11a/b/g, Bluetooth, and Ultra Wideband for wired connection typified by USB as described above, and further, it may be possible to perform download using optical communications such as IrDA.

Moreover, the aforementioned Embodiment describes the operation on the reception side, and the operation on the transmission side is performed in the same way.

Embodiment 2

Figure 18:
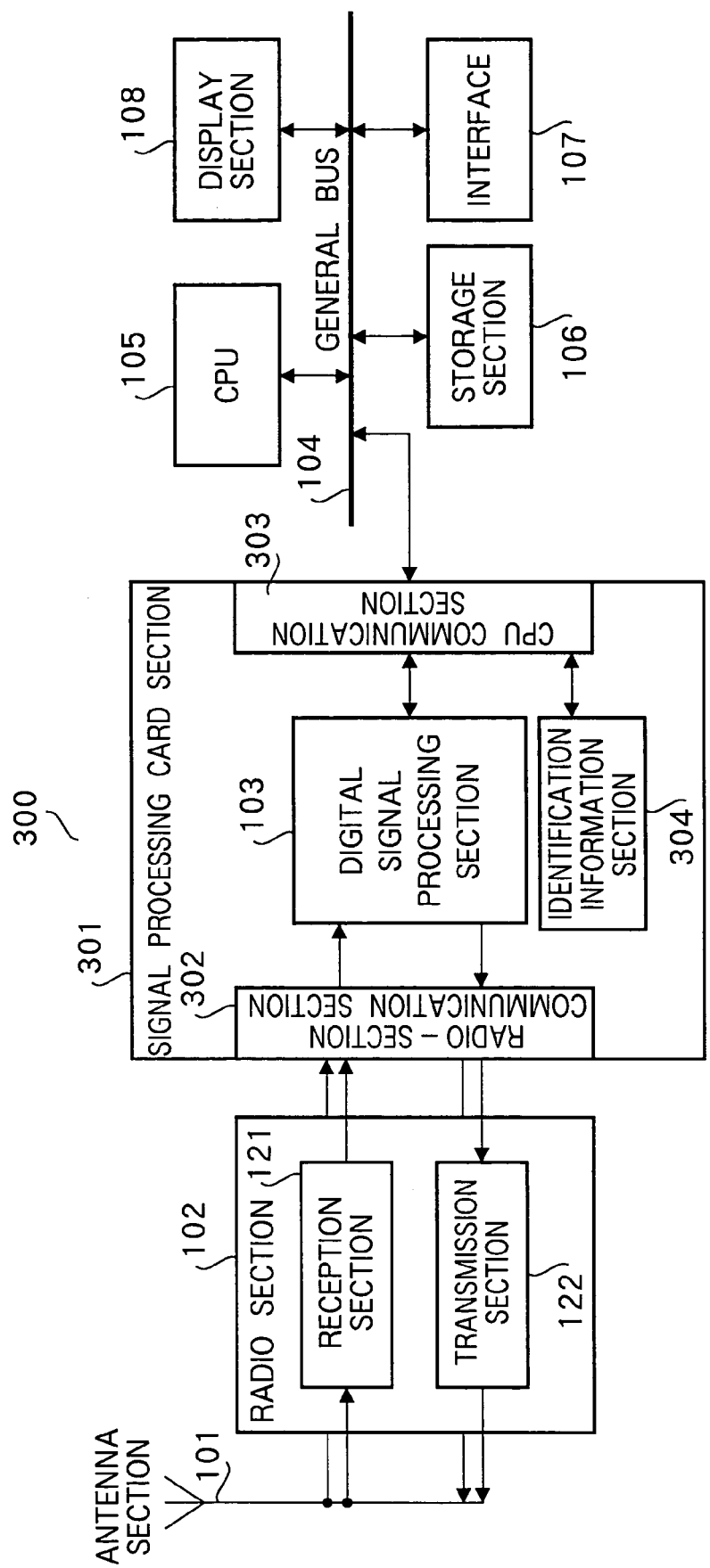
FIG. 18 is a block diagram illustrating a configuration of a communication apparatus according to Embodiment 2 of the present invention.

FIG. 18 is a block diagram illustrating a configuration of a communication apparatus according to Embodiment 2 of the present invention. Communication apparatus 300 in FIG. 18 has signal processing card section 301 detachable to the outside, thereby enables a reconfigurable digital signal processing portion to be detachable, and in this respect, is different from the communication apparatus in FIG. 1.

Signal processing card section 301 is mainly comprised of digital signal processing section 103, radio-section communication section 302, CPU communication section 303, and identification information section 304, and further provided with display 108 connected to general bus 104.

Digital signal processing section 103 transmits/receives an input/output signal to/from radio section 102 via radio-section communication section 302. Further, the section 103 transmits/receives an input/output signal to/from CPU 105 via CPU communication section 303. Identification information section 304 stores version information of signal processing card section 301, and CPU 105 gains access to identification information section 304 via CPU communication section 303.

CPU 105 reads identification information for identifying a version of the signal processing card from identification information section 304, and referring to storage section 106, recognizes the version of the connected signal processing card 301.

Figure 19:
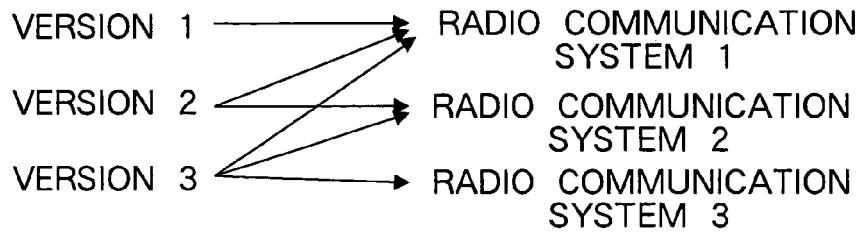
FIG. 19 is a diagram illustrating an example of details stored in a storage device of the communication apparatus of the Embodiment.

Storage section 106 stores correspondence relationship between the identification information and the version of signal processing card 301. FIG. 19 is a diagram illustrating an example of details stored in the storage device of the communication apparatus of this Embodiment. In FIG. 19, version 1 supports radio communication system 1, version 2 supports radio communication system 1 and radio communication system 2, and version 3 supports radio communication systems 1, 2 and 3.

Referring to the correspondence relationship in FIG. 19, CPU 105 understands a type of radio communication system to which digital signal processing section 103 is reconfigurable, from the recognized version. Accordingly, CPU 105 selects a currently optimal radio communication system from among reconfigurable radio communication systems, and enables digital signal processing section 103 to be reconfigured. Further, CPU 105 stores the selected radio communication system in identification information section 304.

Figure 20:
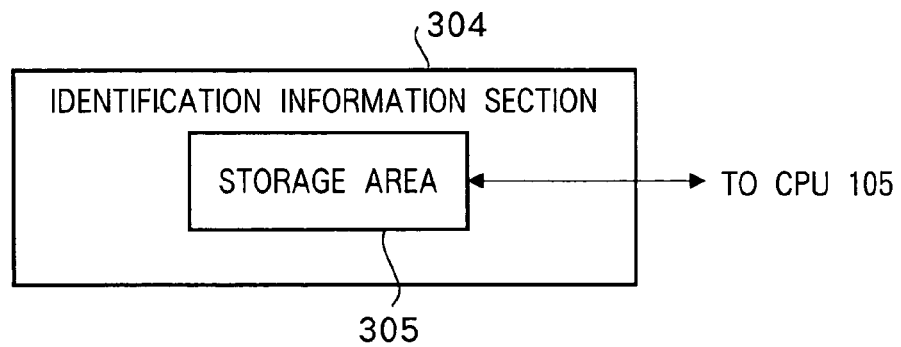
FIG. 20 is a block diagram illustrating a configuration of a storage section of the communication apparatus of the Embodiment.

Meanwhile, identification information section 304 has a storage area therein as shown in FIG. 20, and stores the version of signal processing card 301 and the selected radio communication system. FIG. 20 is a block diagram illustrating a configuration of the storage section of the communication apparatus of this Embodiment. Identification information section 304 stores the version of signal processing card 301 and the selected radio communication system in storage area 305.

Figure 21:
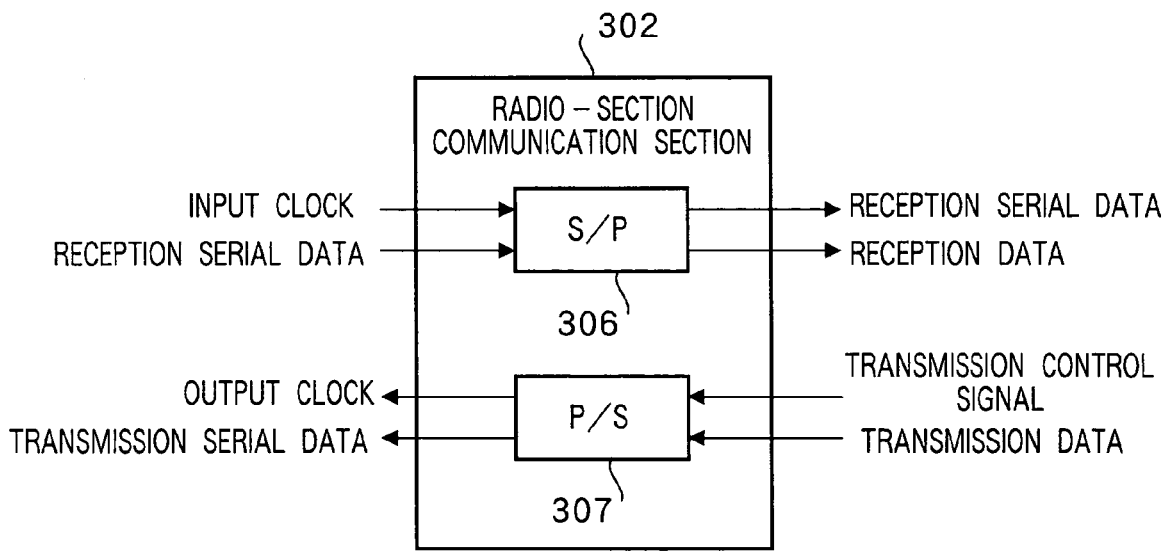
FIG. 21 is a block diagram illustrating a configuration of a radio-section communication section of the communication apparatus of the Embodiment.

Radio-section communication section 302 is an interface that connects digital signal processing section 103 and radio section 102. FIG. 21 is a block diagram illustrating a configuration of the radio-section communication section of the communication apparatus of this Embodiment. As shown in FIG. 21, radio-section communication section 302 receives data from radio section 102 using input clock and reception serial data. Radio-section communication section 302 transforms the input serial data into parallel data in serial/parallel transformer (S/P) 306, and outputs a reception control signal and reception data to digital signal processing section 103.

Further, in the direction opposite thereto, radio-section communication section 302 receives transmission data from digital signal processing section 103 using a transmission data, transforms the data into serial data in parallel/serial transformer (P/S) 307, and outputs the transmission data to radio section 102 as transmission serial data.

In addition, in the similar constitution as in radio-section communication section 302, CPU communication section 303 also receives/outputs data from/to CPU 105. CPU communication section 303 outputs data input from CPU 105 to digital signal processing section 103 or identification information section 304, and further outputs data input from digital signal processing section 103 or identification information section 304 to CPU 105.

Herein, descriptions are given of identification information section 304 explicitly separated from digital signal processing section 103, but according to configurations, identification information section 304 provided inside digital signal processing section 103 allows implementation in the same way.

Further, when signal processing card section 301 has extra connection pins to connect to the outside, radio-section communication section 302 or CPU communication section 303 may be implemented by bus connection, instead of serial connection.

Thus, according to the communication apparatus of this Embodiment, by enabling a portion that reconfigures only a portion different among a plurality of radio communication systems to be detachable, it is possible to expand to a card into which more reconfigurable elements are integrated, and it is thereby possible to cause the communication apparatus to support a larger-scale radio communication system.

Embodiment 3

Figure 22:
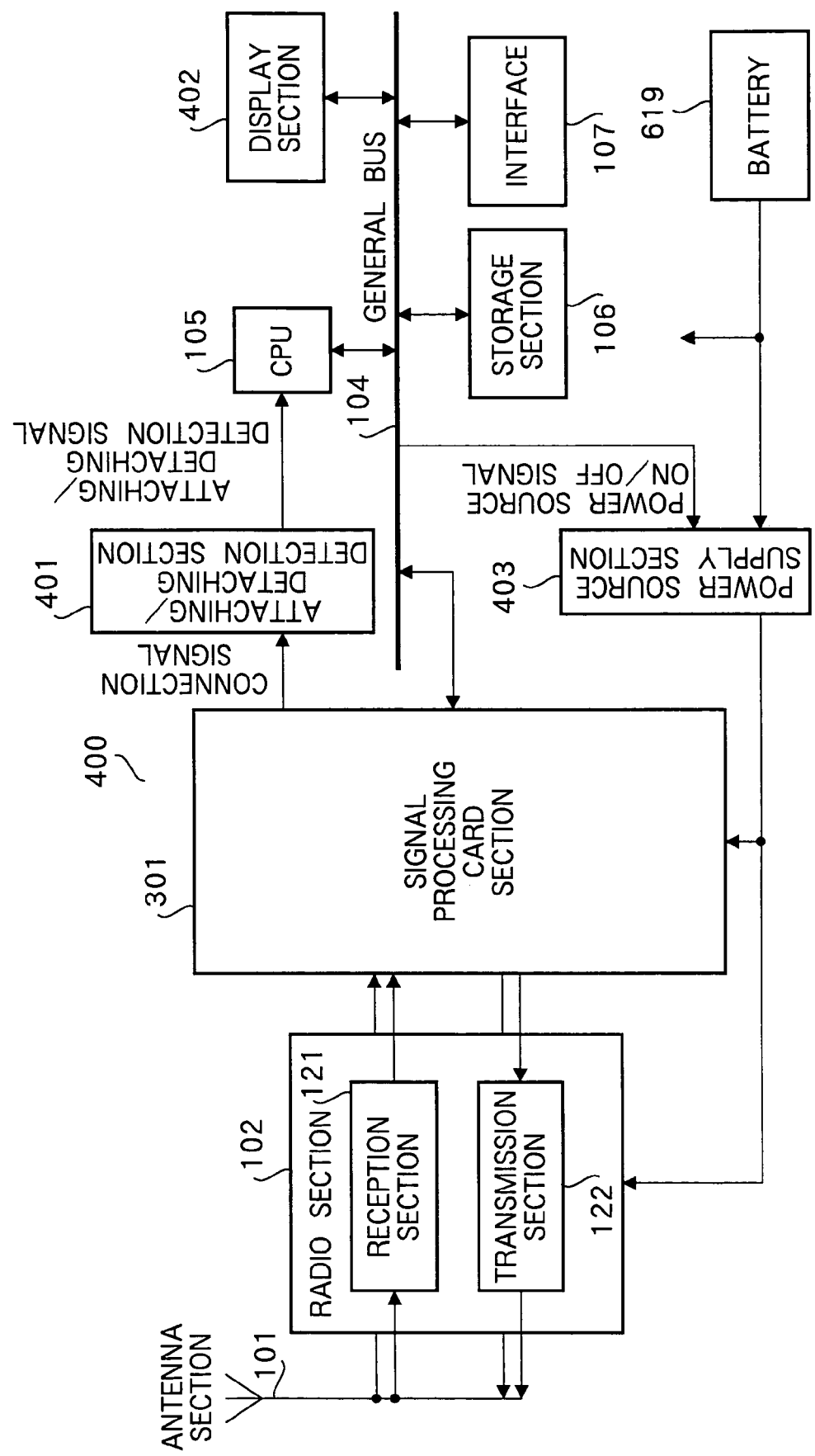
FIG. 22 is a block diagram illustrating a configuration of a communication apparatus according to Embodiment 3 of the present invention.

FIG. 22 is a block diagram illustrating a configuration of a communication apparatus according to Embodiment 3 of the present invention. Communication apparatus 400 in FIG. 22 has attaching/detaching detection section 401, display section 402, power source supply section 403, and battery 619, enables a portion that reconfigures only a portion different among a plurality of radio communication systems to be detachable, halts power supply to a radio transmission portion when the portion to reconfigure is detached, while supplying power to the radio transmission portion and the portion to reconfigure when the portion to reconfigure is attached, and in this respect, differs from the communication apparatus in FIG. 18.

Attaching/detaching detection section 401 detects connection between signal processing card 301 and communication apparatus 400, and when the card 301 is not connected, inputs a detaching detection signal to CPU 105 to notify that signal processing card 301 does not exist in communication apparatus 400.

When it is notified that signal processing card section 301 does not exist in communication apparatus 400, CPU 105 displays a warning such that "no communication card exists" on display section 402 to inform a user, and outputs an instruction for turning off the power to supply to radio section 102 and signal processing card section 301, using a power source ON/OFF signal connected to power source supply section 403.

According to the power source ON/OFF signal output from CPU 105, power source supply section 403 turns off the power supply to radio section 102 and signal processing card section 301 from battery 619.

By the aforementioned operation, it is possible to prevent unnecessary power consumption on the peripheries of radio section 102 and signal processing card section 301, and to control radio section 102 not to transmit an unnecessary radio signal. Further, at this point, communication apparatus 400 executes only the functions as an application terminal such as display, replay and edition of stored data such as image, music and mail, using display section 402, interface section 107 and storage section 106.

When CPU 105 detects that signal processing card 301 is connected to communication apparatus 400 via attaching/detaching detection section 401, CPU 105 displays information such that "the communication card is confirmed" or "wireless communications are available" on display section 402 to inform a user, and outputs an instruction for supplying the power to radio section 102 and signal processing card section 301, using a power source ON/OFF signal connected to power source supply section 403.

According to the power source ON/OFF signal output from CPU 105, power source supply section 403 starts supplying the power to radio section 102 and signal processing card section 301 from battery 619.

Figure 23:
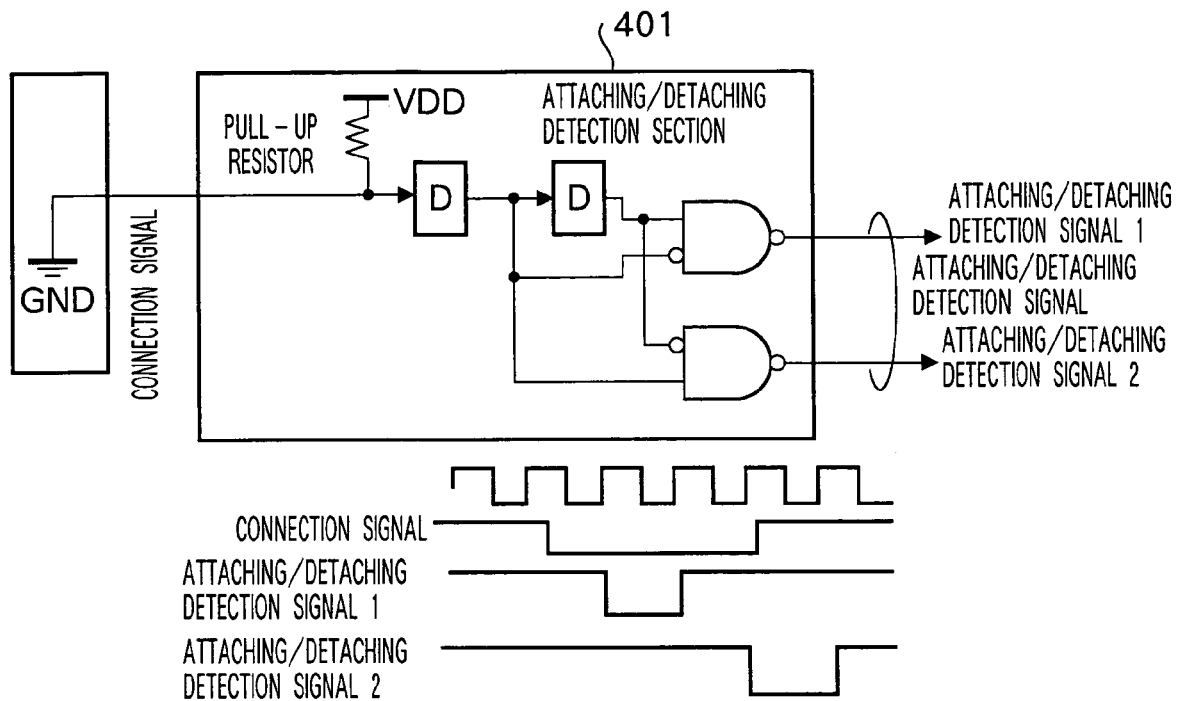
FIG. 23 is a diagram illustrating a configuration of an attaching/detaching detection section of the communication apparatus of the Embodiment.

Attaching/detaching detection section 401 is actualized using delay elements and logic gates as shown in FIG. 23. FIG. 23 is a diagram illustrating a configuration of the attaching/detaching detection section of the communication apparatus of this Embodiment.

Using a differential circuit as shown in FIG. 23, and further using a connection signal which is connected to GND in signal processing card section 301 such that the signal is pulled up to be "1" when signal processing card section 301 is removed, while being "0" when the section 301 is connected, a low pulse is output to attaching/detaching detection signal 1 when the connection signal is switched to "0" from "1" as shown in timing, i.e. when the removed signal processing card section 301 is connected.

Meanwhile, when the connection signal is switched to "1" from "0", i.e. when the connected signal processing card section 301 is removed, a low pulse is output to attaching/detaching detection signal 2. These attaching/detaching detection signals are input to CPU 105, whereby CPU 105 is capable of detecting attaching/detaching of signal processing card section 301.

Figure 24:
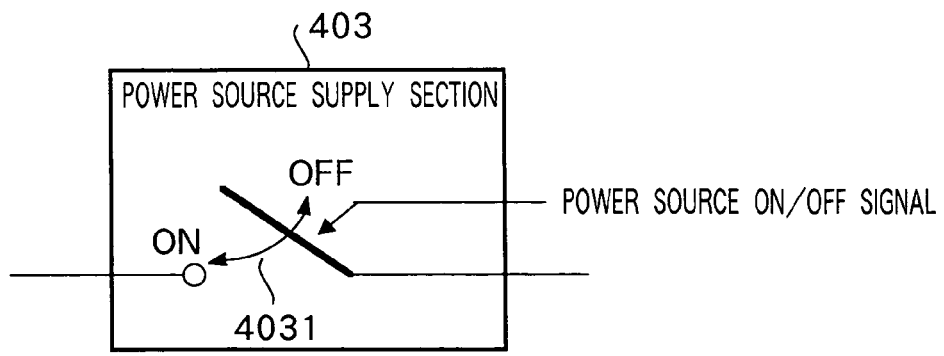
FIG. 24 is a diagram illustrating a configuration of the attaching/detaching detection section of the communication apparatus of the Embodiment.

As shown in FIG. 24, power source supply section 403 is provided therein with switch 4031, and turns ON or OFF switch 4031 according to a power source ON/OFF signal from CPU 105. When switch 4031 is ON, the section 403 supplies the power from battery 619 to radio section 102 and signal processing card section 301. On the other hand, when switch 4031 is OFF, the section 403 interrupts supply of the power.

Thus, according to the communication apparatus of this Embodiment, by enabling a portion that reconfigures only a portion different among a plurality of radio communication systems to be detachable, and halting power supply to a radio transmission portion when the portion to reconfigure is detached, while supplying the power to the radio transmission portion and the portion to reconfigure when the portion to reconfigure is attached, it is possible to prevent unnecessary radio signals from being transmitted, perform functions only as an application terminal, and reduce power consumption.

Further, when detaching is detected, by displaying a status of detaching, it is possible to alert a user.

Embodiment 4

Figure 25:
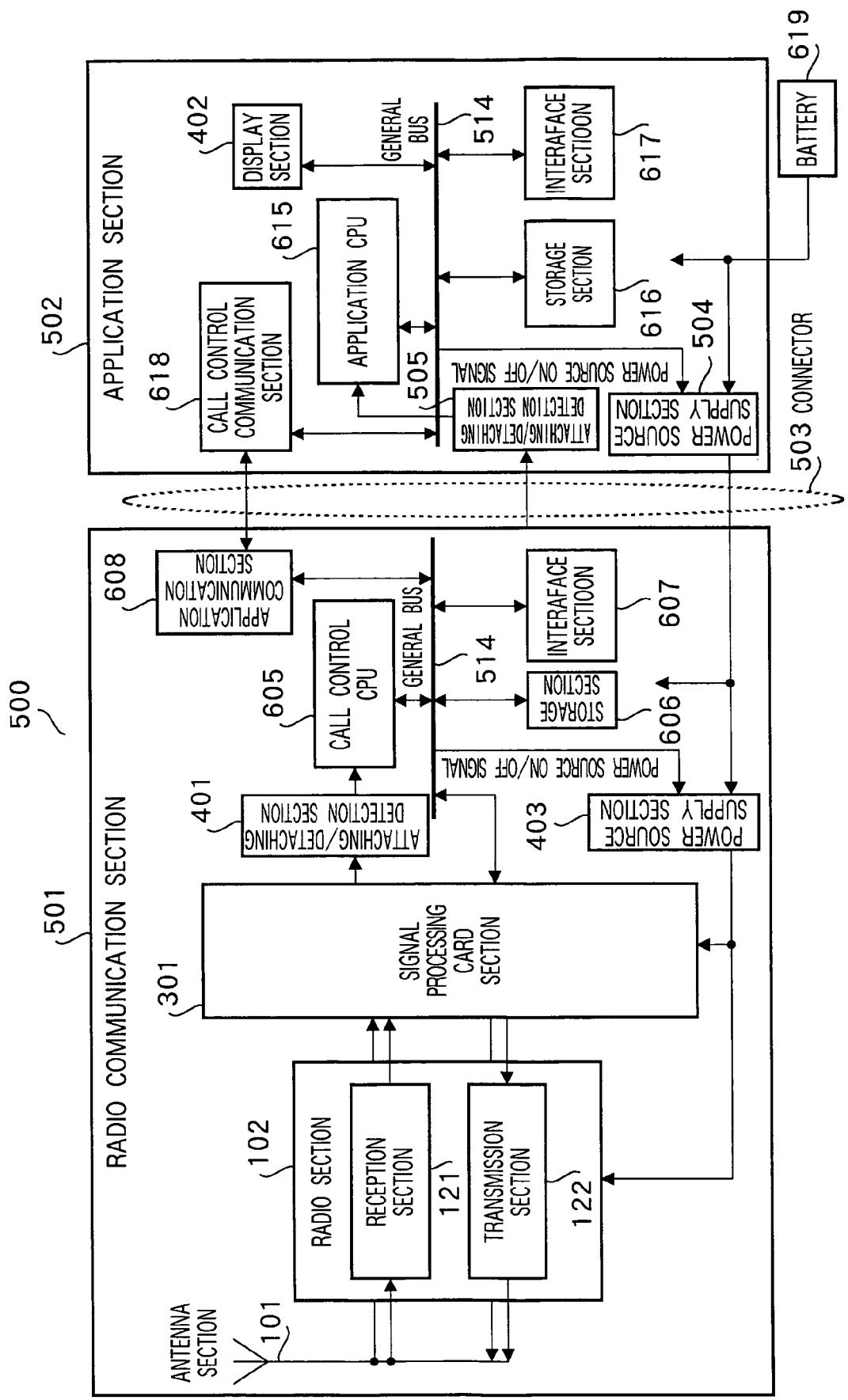
FIG. 25 is a block diagram illustrating a configuration of a communication apparatus according to Embodiment 4 of the present invention.

FIG. 25 is a block diagram illustrating a configuration of a communication apparatus according to Embodiment 4 of the present invention. Communication apparatus 500 in FIG. 25 is comprised of radio communication section 501 and application section 502, thus separated into radio communication section 501 and application section 502, and in this respect, differs from the communication apparatus in FIG. 22.

Radio communication apparatus 501 and application section 502 are provided with respective CPUs, and the CPU of radio communication section 501 is referred to as call control CPU 605, while the CPU of application section 502 is referred to as CPU 615. Then, radio communication section 501 is provided with application communication section 608, while application section 502 is provided with call control communication section 618, thereby implementing communications between two CPUs. More specifically, it is possible to implement in the same way as in the configuration of radio communication apparatus 302 in FIG. 21 as described in Embodiment 2.

Attaching/detaching detection section 401 and power source supply section 403 as described in Embodiment 3 are provided inside radio communication section 501, and attaching/detaching detection section 505 and power source supply section 504 are newly provided also inside application section 502.

When application CPU 615 detects that radio communication section 501 does not exist in communication apparatus 500 via attaching/detaching detection section 505, the CPU 615 displays a warning such that "the wireless communication function is not available" to inform a user, and halts communications with radio communication section 501.

Further, using a power source ON/OFF signal connected to power source supply section 504, application CPU 615 outputs an instruction for turning off the power to supply to radio communication section 501. By this means, at the time radio communication section 501 is opened, even when an output of power source supply section 504 becomes shorted accidentally with GND or a signal of an external apparatus, it is possible to prevent unnecessary power consumption and risk such as ignition and failure. At this point, application section 502 in communication apparatus 500 executes only the functions as an application terminal such as display, replay and edition of stored data such as image, music and mail, using display section 402, interface section 617 and storage section 616.

On the other hand, when application CPU 615 detects that radio communication section 501 is connected to communication apparatus 500 via attaching/detaching detection section 505, the CPU 615 displays information such that "wireless communications are available" on display section 402 to inform a user, and starts supplying the power to radio communication section 501, using a power source ON/OFF signal connected to power source supply section 504.

Battery 619 supplies the power to radio communication section 501 and application section 502, and is charged when the power is supplied from an external power source such as an external device.

In addition, it may be possible that connector 503 is provided between radio communication section 501 and application section 502, and that a signal between application communication section 608 and call control communication section 618 is connected or separated using connector 503. Similarly, the power to supply from battery 619 to radio communication section 501 may be connected or separated via connector 503.

Figure 26:
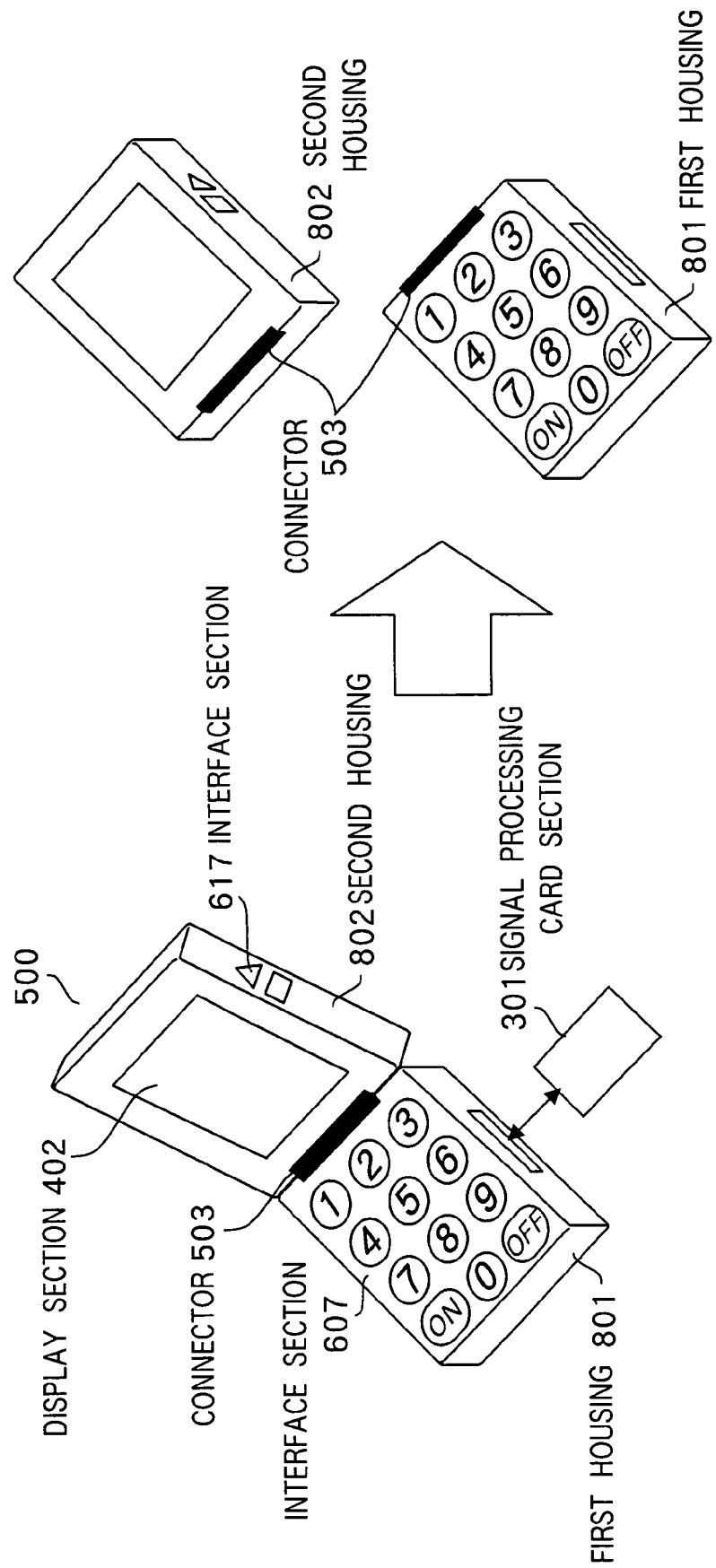
FIG. 26 is a view showing an example of the appearance of the communication apparatus of the Embodiment.

Thus, in the communication apparatus, radio communication section 501 and application section 502 are separated, first housing 801 is installed with radio communication section 501, while second housing 802 is installed with application section 502 as shown in FIG. 26, housings 801 and 802 are connected with connector 503, and it is thereby possible to connect or separate first housing 801 and second housing 802.

Figure 27:
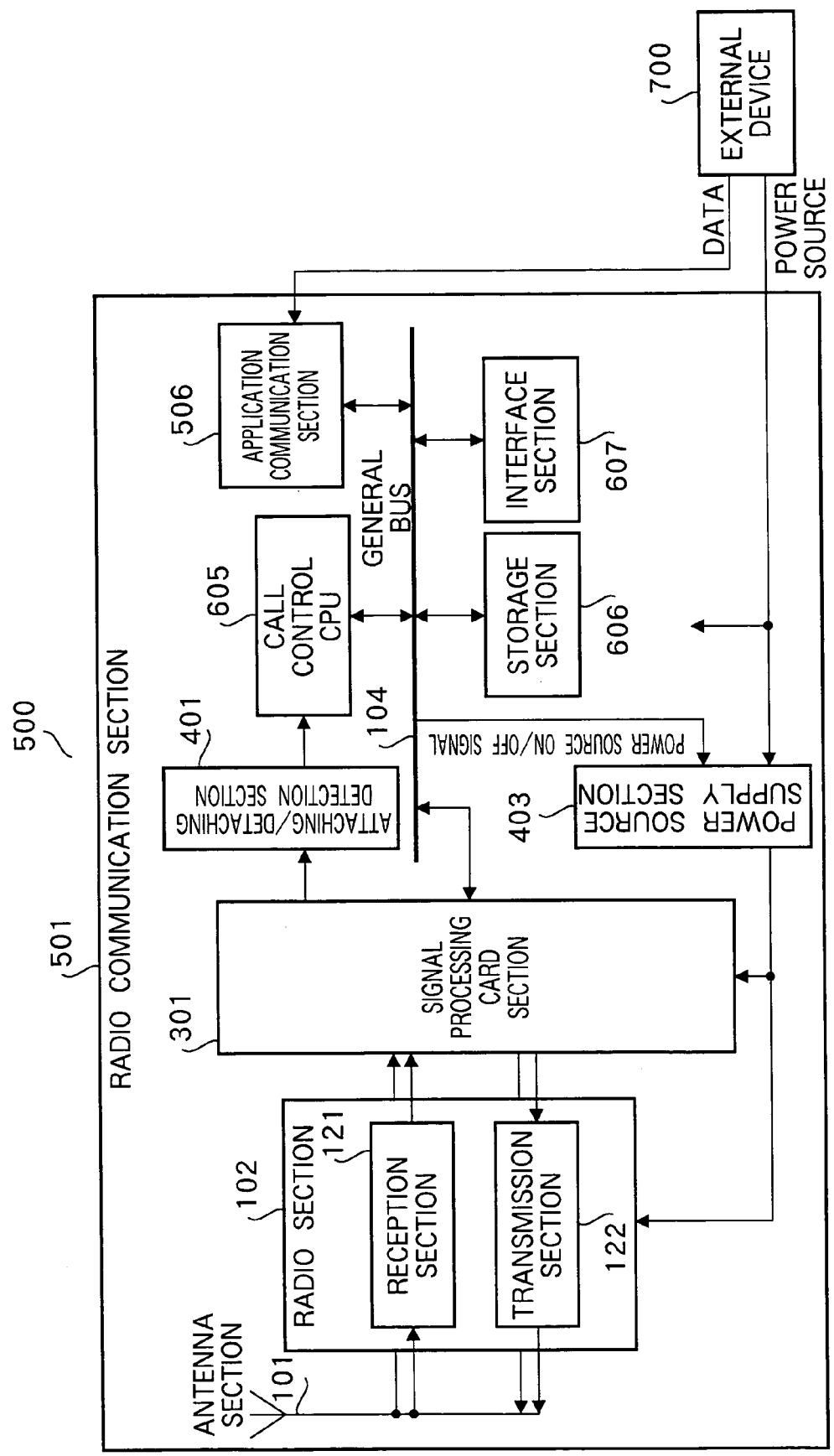
FIG. 27 is a block diagram illustrating a configuration of the communication apparatus of the Embodiment.

In this way, for example, as shown in FIG. 27, radio communication section 501 in first housing 801 is connected to, for example, a personal computer, PDA or external device 700 of a train, bus or car, and is capable of functioning as a modem card of external device 700. In this case, external device 700 supplies the power to radio communication section 501 via connector 503.

Figure 28:
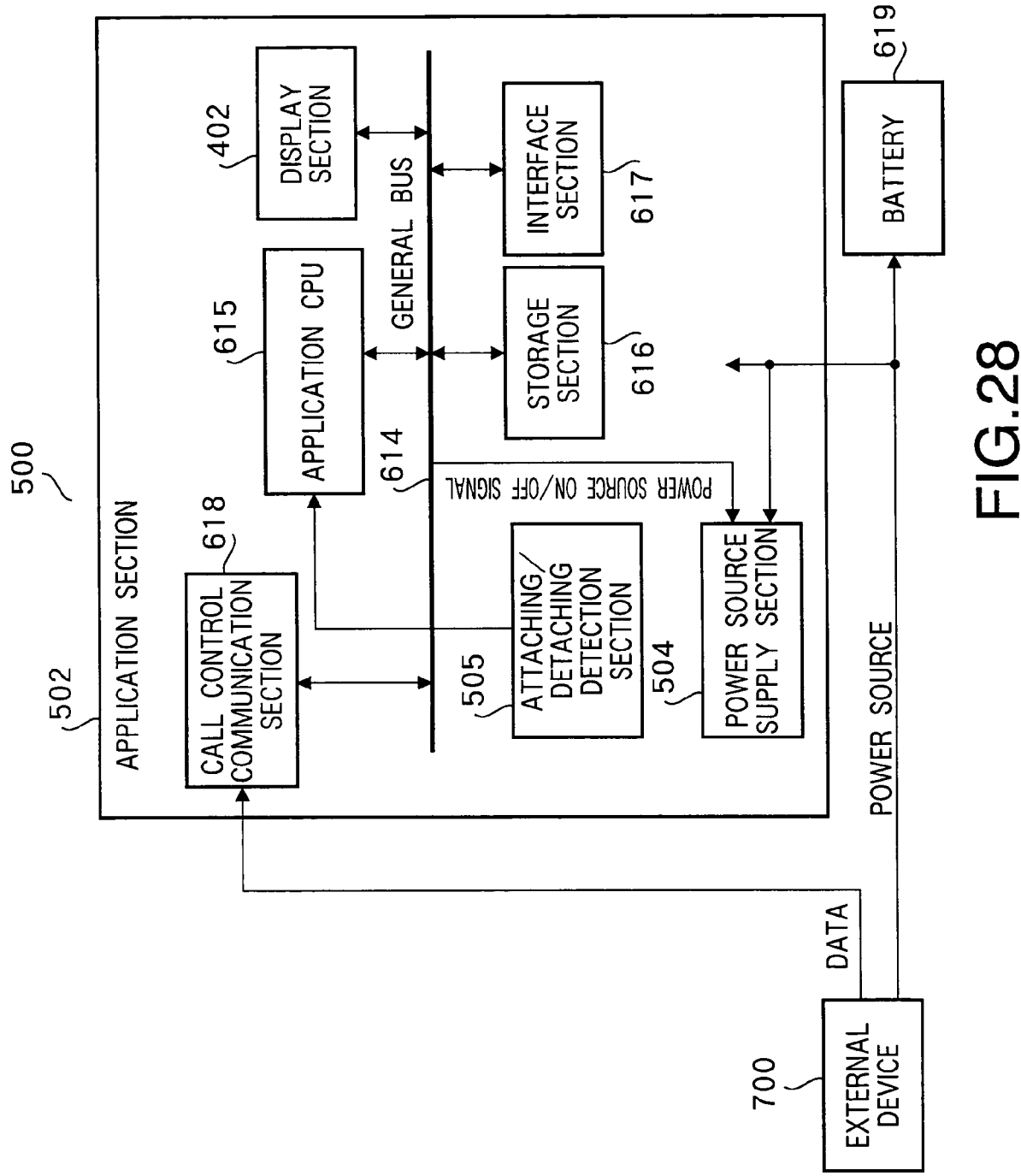
FIG. 28 is a block diagram illustrating a configuration of an application section of the communication apparatus of the Embodiment.

Meanwhile, for example, as shown in FIG. 28, application section 502 in second housing 802 is connected to, for example, a personal computer, PDA or external device 700 of a train, bus or car, external device 700 reads and/or writes application data in storage section 616, and thus, the data can be input and output. Further, a user is capable of removing only second housing 802 to use as an application terminal. When external device 700 is connected to application section 502, external device 700 is also capable of charging battery 619, while supplying the power to application section 502, via connector 503.

Thus, according to the communication apparatus of this Embodiment, a user is capable of expanding to a card into which more reconfigurable elements are integrated, and it is thereby possible to cause the communication apparatus to support a larger-scale radio communication system. Further, first housing 801 and second housing 802 can be separated, and therefore, used in another way such as an application terminal and a modem card of an external device, other than a radio communication terminal, and it is possible to carry only either of the housings according to the application.

Further, by standardizing the connector, for example, in USB or IEEE1394, it is possible to purchase only application section 502, for example, installed with latest display section 402 to replace, thereby enabling less expensive replacement than the conventional case where radio communication section 501 is present. Meanwhile, it is possible to purchase only radio communication section 501 inexpensively. Further, it is possible to select different manufacturers for radio communication section 501 and application section 502 corresponding to user preference.

Furthermore, by connecting connector 503 in a specific power-saving radio communication system such as, for example, Bluetooth and UWB (Ultra Wide Band), it is possible to separate first housing 801 and second housing 802 with the communication function kept. For example, such a usage method is made possible that relatively large housing 801 is put into a bag of a user, while the user carries relatively small second housing 802 thereon, and thus, the need is eliminated that the user always holds the two housings by hand unlike the conventional case. There arises another advantage for reducing in size and weight a terminal to wear.

In addition, the present invention is not limited to aforementioned Embodiments, and is capable of being carried into practice with various modifications thereof. For example, the above-mentioned Embodiments describe the case of implementation as a communication apparatus, but the present invention is not limited to such a case. It may be possible to implement the communication apparatus reconfiguration method as software.

For example, it may be possible that a program for executing the communication apparatus reconfiguration method is stored in ROM (Read only Memory) in advance, and is operated by a CPU (Central Processor Unit).

Further, it may be possible that a program for executing the communication apparatus reconfiguration method is stored in a computer readable storage medium, the program stored in the storage medium is stored in RAM (Random Access Memory) of a computer, and the computer is operated according to the program.

Furthermore, while in the above descriptions orthogonal transform is performed using FFT means, the means of orthogonal transform is not limited to Fourier transform, and any means is available as long as orthogonal transform is obtained. For example, it may be possible to use discrete cosine transform or the like.

As is apparent from the foregoing, according to the communication apparatus and communication apparatus reconfiguration method of the present invention, in a communication apparatus which downloads programming data of a radio communication system of a handover destination, and reconfigures a reconfigurable device using the downloaded data, the communication apparatus is originally provided with processing units that can be shared by a plurality of radio communication systems, downloads as the programming data only connection information of connection between the internal processing units, connection information of connection inside the processing units and control information, and is thereby capable of reducing the circuit scale and an amount of programming data and shortening the download time.

As a result, the need is eliminated for providing a download dedicated channel to perform high-speed download and accommodating a large number of users in a wideband high-transmission rate radio communication system, and it is thus possible to avoid decreases in user capacity of the entire system. It is further possible to reduce the circuit scale.

This application is based on the Japanese Patent Application No. 2002-294031 filed on Oct. 7, 2002, entire content of which is expressly incorporated by reference herein.

INDUSTRIAL APPLICABILITY

The present invention is suitable for use in communication apparatuses.

The invention claimed is:

1. A communication apparatus comprising:
 a radio section that receives a radio signal to convert into a baseband signal;
 a baseband signal processor that executes processing that is common among a plurality of radio communication systems and processing that is different among the plurality of radio communication systems on the baseband signal; and
 a reconfiguring section that reconfigures only a portion in the baseband signal processor that executes the processing that is different among the plurality of radio communication systems, based on programming data of a new radio communication system upon switching of radio communication systems, and halts at least one of a clock and a power supply in an unused portion in the baseband signal processor.

2. The communication apparatus according to claim 1, wherein the portion in the baseband signal processor that executes the processing that is different among the plurality of radio communication systems comprises:
 a synchronization section that establishes synchronization of communications, and
 a compensator that corrects amplitude or a phase of the baseband signal.

3. The communication apparatus according to claim 2, wherein:
 the portion in the baseband signal processor that executes the processing that is different among the plurality of radio communication systems comprises an FFT section that executes orthogonal transform on the baseband signal, and
 the reconfiguring section reconfigures a processing portion of the FFT section, the processing portion varying with the number of items of data subjected to the orthogonal transform.

4. The communication apparatus according to claim 3, wherein the synchronization section determines synchronization timing using a baseband signal obtained by demodulating a signal mapped on a subcarrier by the orthogonal transform in the FFT section.

5. The communication apparatus according to claim 2, wherein:
 the portion in the baseband signal processor that executes the processing that is different among the plurality of radio communication systems comprises a correlation section that executes correlation processing of the baseband signal, and
 the reconfiguring section reconfigures a combination of operations in the correlation section.

6. The communication apparatus according to claim 5, wherein the synchronization section determines synchronization timing using a result of the correlation processing of the baseband signal in the correlation section.

7. The communication apparatus according to claim 1, wherein:
 the portion in the baseband signal processor that executes the processing that is different among the plurality of radio communication systems comprises an error controller which performs error correction of the baseband signal or a retransmission request when the baseband signal has an error, and the reconfiguring section reconfigures a processing portion of the error controller, the processing portion different among a plurality of error correction systems or error detection systems.

8. The communication apparatus according to claim 7, further comprising:

a storage section that stores a result of processing of the error controller, wherein the reconfiguring section reconfigures connection with an output destination of content stored in the storage section.

9. The communication apparatus according to claim 1, wherein the reconfiguring section acquires information required for reconfiguration from the radio signal received in the radio section to reconfigure the portion in baseband signal processor that executes the processing that is different among the plurality of radio communication systems.

10. The communication apparatus according to claim 1, further comprising:

an interface section that reads out data stored in the storage section, wherein the reconfiguring section acquires information required for reconfiguration from the storage section via the interface section to reconfigure the portion in the baseband signal processor that executes the processing that is different among the plurality of radio communication systems.

11. The communication apparatus according to claim 1, further comprising:

an interface section that receives information required for reconfiguration, in wired connection, wherein the reconfiguring section acquires the information required for reconfiguration from the storage section via the interface section to reconfigure the portion in the baseband signal processor that executes the processing that is different among the plurality of radio communication systems.

12. The communication apparatus according to claim 1, further comprising:

an interface section that receives information required for reconfiguration, in specific power-saving radio communications, wherein the reconfiguring section acquires the information required for reconfiguration from the storage section via the interface section to reconfigure the portion in the baseband signal processor that executes the processing that is different among the plurality of radio communication systems.

13. The communication apparatus according to claim 1, further comprising:

a radio-section communication section that relays communications between the radio section and the baseband signal processor; and a CPU communication section that relays communications between the baseband signal processor and the reconfiguring section, wherein the baseband signal processor is detachable.

14. The communication apparatus according to claim 13, further comprising:

an attaching/detaching detector that detects attaching/detaching of the baseband signal processor; and a first power source supplier which supplies power to the radio section, and when detaching of the baseband signal processor is detected, halts supply of the power to the radio section.

15. The communication apparatus according to claim 13, further comprising:

a radio communication section that performs radio communications;

an application section that performs display, replay and edition of data of image, music and mail; and a connector that relays communications between the radio communication section and the application section, wherein:

the radio communication section and the application section are separable, the radio communication section comprises:

a radio-section communication section that relays communications between the radio section and the baseband signal processor, a CPU communication section that relays communications between the detachable baseband signal processor and the reconfiguring section, a first CPU, and an application communication section that relays communications with the application section, and the application section comprises:

a call control communication section that relays communications with the radio communication section, a separation detector that detects separation of the radio communication section, and a second CPU that halts communications to the radio communication section when separation of the radio communication section is detected.

16. The communication apparatus according to claim 13, further comprising:

a radio communication section that performs radio communications;

an application section that performs display, replay and edition of data of image, music and mail; and a connector that relays communications between the radio communication section and the application section, wherein:

the radio communication section and the application section are separable, the radio communication section comprises:

a radio-section communication section that relays communications between the radio section and the baseband signal processor, a CPU communication section that relays communications between the detachable baseband signal processor and the reconfiguring section, a first CPU, an attaching/detaching detector that detects attaching/detaching of the second baseband signal processor, a first power source supplier which supplies power to the radio section, and when detaching of the baseband signal processor is detected, halts supply of the power to the radio section, and an application communication section that relays communications with the application section, and the application section comprises:

a call control communication section that relays communications with the radio communication section, a separation detector that detects separation of the radio communication section, a second power source supplier which supplies power to the radio communication section, and when separation of the radio communication section is detected, halts supply of the power to the radio section, and a second CPU that halts communications to the radio communication section when separation of the radio communication section is detected.

17. A reconfiguration method of a communication apparatus comprising:
- a radio section that receives a radio signal to convert into a baseband signal;
- a baseband signal processor that executes processing that is common among a plurality of radio communication systems and processing that is different among the plurality of radio communication systems on the baseband signal; and the reconfiguration method comprising:
- downloading programming data of a second radio communication system in order to perform handover for switching to the second radio communication system during communication in a first radio communication system;
- reconfiguring a portion in the baseband signal processor that executes processing that is different among the plurality of radio communication systems, based on the programming data; and
- halting at least one of a clock and a power supply in an unused portion in the baseband signal processor.

* * * * *